(12) United States Patent
Mohammed et al.

(10) Patent No.: US 11,381,582 B1
(45) Date of Patent: Jul. 5, 2022

(54) ENERGY CYBER-PHYSICAL SYSTEM DIGITAL TWIN PLAYGROUND

(71) Applicants: Osama Mohammed, Miami, FL (US); Ahmed A. Saad, Miami, FL (US)

(72) Inventors: Osama Mohammed, Miami, FL (US); Ahmed A. Saad, Miami, FL (US)

(73) Assignee: THE FLORIDA INTERNATIONAL UNIVERSITY BOARD OF TRUSTEES, Miami, FL (US)

(*) Notice: Subject to any disclaimer, the term of this patent is extended or adjusted under 35 U.S.C. 154(b) by 0 days.

(21) Appl. No.: 17/340,782

(22) Filed: Jun. 7, 2021

(51) Int. Cl.
*H04L 29/06* (2006.01)
*H04L 9/40* (2022.01)
*G06F 30/20* (2020.01)

(52) U.S. Cl.
CPC .......... *H04L 63/1416* (2013.01); *G06F 30/20* (2020.01); *H04L 63/1466* (2013.01)

(58) Field of Classification Search
CPC .. G06F 30/20; H04L 63/1416; H04L 63/1466
USPC .......................................................... 726/22
See application file for complete search history.

(56) References Cited

U.S. PATENT DOCUMENTS

| | | | | |
|---|---|---|---|---|
| 2005/0033481 A1* | 2/2005 | Budhraja | ............... | H02J 3/008 700/286 |
| 2007/0096942 A1* | 5/2007 | Kagan | ................... | G01D 4/002 340/870.02 |
| 2008/0077512 A1* | 3/2008 | Grewal | .................. | G06F 16/29 705/28 |
| 2011/0010016 A1* | 1/2011 | Giroti | .................... | G06Q 10/06 700/291 |
| 2013/0091258 A1* | 4/2013 | Shaffer | ..................... | H02J 3/00 709/221 |
| 2013/0253898 A1* | 9/2013 | Meagher | ............... | G06N 20/00 703/18 |
| 2015/0134135 A1* | 5/2015 | Wong | ............... | H02J 13/00034 700/295 |
| 2017/0201198 A1* | 7/2017 | Wang | ..................... | H02P 21/14 |
| 2017/0324671 A1* | 11/2017 | Zhang | .............. | H02J 13/00028 |
| 2018/0358840 A1* | 12/2018 | Gu | ........................ | H02M 7/217 |
| 2019/0356556 A1* | 11/2019 | Vicat-Blanc | ............ | G06F 30/20 |
| 2019/0390622 A1* | 12/2019 | Saleem | ............... | F02D 41/1454 |
| 2021/0157312 A1* | 5/2021 | Celia | ...................... | G06Q 10/20 |
| 2021/0304099 A1* | 9/2021 | Gódor | .................... | G06Q 10/00 |
| 2022/0012204 A1* | 1/2022 | Lam | ...................... | G06F 13/385 |

OTHER PUBLICATIONS

NPL Search Terms (Year: 2021).*

(Continued)

*Primary Examiner* — Syed A Zaidi
(74) *Attorney, Agent, or Firm* — Saliwanchik, Lloyd & Eisenschenk

(57) ABSTRACT

Systems and methods for enhancing resiliency of a power system (e.g., an energy cyber-physical system (ECPS)) against cyber-attacks are provided. An internet of things (IoT)-based digital twin (DT) for cyber-physical networked microgrids (NMGs) can be implemented to be a centric oversight for the NMG system. A cloud system can host the controllers (cyber things) and the sensors (physical things) of the power system into the cloud IoT core in terms of the IoT shadow. The DT can cover the digital replica for the physical layer, the cyber layer(s), and their hybrid interactions.

12 Claims, 28 Drawing Sheets

(56) References Cited

OTHER PUBLICATIONS

Tugarinov, Petr, Frank Truckenmiiller, and Bernhard Nold. "Digital twin of distributed energy devices." Proceedings of the International Scientific and Technical Conference: Forum of Mining Engineers. 2019. (Year: 2019).*

Shin, Youngmee, Wanki Park, and Ilwoo Lee. "Design of microgrid web services for microgrid applications." 2017 Ninth International Conference on Ubiquitous and Future Networks (ICUFN). IEEE, 2017. (Year: 2017).*

Kirchhof JC, Michael J, Rumpe B, Varga S, Wortmann A. Model-driven digital twin construction: synthesizing the integration of cyber-physical systems with their information systems. InProceedings of the 23rd ACM/IEEE International Conference on Model Driven Engineering Languages and Systems Oct. 18, 2020 (Year: 2020).*

NPL Search Terms (Year: 2022).*

Ahmed Saad et al., On the Implementation of IoT-Based Digital Twin for Networked Microgrids Resiliency Against Cyber Attacks, IEEE transactions on Smart Grid, vol. 11, No. 6, Nov. 2020, pp. 5138-5150.

Ahmed Saad et al., IoT-Based Digital Twin for Energy Cyber-Physical Systems: Design and Implementation, Energies 2020, 13, 4762; published Sep. 12, 2020, www.mpdi.com/journal/energies, 19 pages.

\* cited by examiner

COMMUNICATION PERFORMANCE UNDER DELAY FOR 256$B$ MESSAGES

| Middleware | Unicast/Multicast | $QoS$ | $\tau_{av}$ (ms) | $\tau_{max}$ (ms) |
|---|---|---|---|---|
| Edge-edge, DDS | Unicast | Best effort | 0.252 | 0.454 |
| | Multicast | Best effort | 0.275 | 0.622 |
| Edge-cloud, MQTT | Unicast | Level 1 | 105 | 301 |

Algorithm 1 Digital Twin Algorithm on Cloud

1: Initialize $DT$ model and import auxiliary functions
2: Connect to $IoT$ Core and Shadow Service
3: Construct full state $DT$ using $LO$ such that:
4: $\tilde{\mathcal{U}}_i = \begin{bmatrix} \mathcal{Z}_0 & \mathcal{Z}_i \end{bmatrix}^T$, $rk(\tilde{\Lambda})$ is full
5: Initialize security event function $q = 0$
6: while *True* do
7:     Estimate the full state, $\widehat{\mathcal{X}}_i(h+1) = \tilde{\Lambda}\widehat{\mathcal{X}}_i(h) + \tilde{\Gamma}\tilde{\mathcal{U}}_i(h)$
8:     if $\exists \, i$ s.t $\|\mathcal{Z}_i(h) - \mathcal{O}_i\widehat{\mathcal{X}}_i(h)\|_2^2 \leq TH \lor q \neq 0$ then
9:         Launch security authentication and audit function.
10:         $\Xi_{t_q+1}(\eta, \tilde{\Lambda}, \tilde{\Gamma}, \widehat{\mathcal{X}}) = \text{AuthAudit}\left(\mathcal{Z}_{t_q}, \varrho_{t_q}\right)$
11:         Reconstruct $DT$ with the healthy model $\Xi_{t_q+1}$
12:     else
13:         Keep the full $DT$ $\Xi_{t_q+1} = \Xi_{t_q}$
14:     Update $\mathcal{Z}_i^{des}(h)$    ▷ update desired shadow → edge

FIG. 14

Algorithm 2 AuthAudit $(\mathcal{Z}_{t_q}, \varrho_{t_q})$

1: Input $\mathcal{Z}_i^\Psi(t_q), \mathcal{Z}_i^\Theta(t_q), \mathcal{Z}_i^\varrho(t_q)$ ▷ from *IoT* shadow
2: Define $\varrho, N_\varrho$ and $\tilde{\mathcal{U}}_\varrho$ ▷ parallel *DT* observers
3: for $\varrho \in 1, 2, \ldots, N_\varrho$ do
4:     Construct *DT* for conflict case $\varrho$ with $\tilde{\mathcal{U}}_\varrho$ such that,
5:     $rk(\tilde{\Lambda})$ is full
6:     Compute the residues for $i^{th}$ shadow state,
7:     $\pi_i(t_q) = \|z_i(t_q) - \mathcal{O}_i\hat{\mathcal{X}}_i(t_q)\|_2^2 - TH$
8:     Normalize the residues, $\pi_i = \pi_i / \|\mathcal{O}_i\|_2^2$
9:     Sort the residues ascendingly, $\pi_{sort} \forall i$
10:     Choose maximum residues indexes,
11:     $\mathcal{J} = \text{Max}(\pi_{sort}).\text{Index}$
12:     Convert non-zero indices $\mathcal{J}$ into Boolean vector $\Omega_\varrho$
13:     Store $\mathcal{J}, \Omega_\varrho$ and $\hat{\mathcal{X}}_\mathcal{J}$
14: Confirm the attacked agents/sensors indices,
15: $\mathcal{F} = \text{supp}\left[\Lambda_{\varrho=1}^{N_\varrho}\Omega_\varrho\right], \eta = \neg\mathcal{F}$
16: Transform $\tilde{\Lambda}, \tilde{\Gamma}$ according to $\eta$ and (33)
17: Return $\eta, \tilde{\Lambda}, \tilde{\Gamma}, \hat{x}_\eta$

FIG. 15

Algorithm 3 Cluster's Leader Resilient Control Algorithm

1: Initialize $MG$ cluster's leader $i^l$ agent, $x_{i^l}, \varrho_{i^l}, \omega_{0,i^l}$
2: $k = 0$
3: while *True* do
4:     Receive $PCC$ agent 0 state,
5:     $x_0(k)$                                    ▷ subscribe on edge
6:     if $(|\Delta x_0(k)| > 0) \vee (q = 1)$ then
7:        Control update event triggered,
8:        Receive desired shadow state,
9:        $\mathcal{Z}_{i^l}^{des} = \{\widehat{\mathcal{X}}^{des}(h), \mathcal{F}\}$       ▷ get *IoT* Shadow
10:       if $\left(x_0(k) \neq \widehat{\mathcal{X}}^{des}(h)\right) \vee (\mathcal{F} = PCC)$ then
11:           Declare $PCC$ agent attacked and excluded,
12:           Cloud $DT$ is tertiary controller,
13:           $x_{i^l}(k+1) = \widehat{\mathcal{X}}^{des}(h)$
14:       else
15:           $PCC$ state accepted, $x_0(k)$
16:           $x_{i^l}(k+1) = x_0(k)$
17:       Send new state to neighbours,
18:       $x_{i^l}(k+1)$                 ▷ publish to edge
19:       Send reported state, $\mathcal{Z}_{i^l}$     ▷ update IoT shadow
20:       Send secured state to $i^l$ primary controller
21:     else
22:        No Update, $x_{i^l}(k+1) = x_{i^l}(k)$
23:     $k = k + 1$

FIG. 16

Algorithm 4 Followers Resilient Control Algorithm
---
1: Initialize $MG$ follower $i^f$ agent, $x_{if}, \varrho_{if}, \omega_{if,f}$
2: $k = 0$
3: while *True* do
4:     Receive $j^{th}$ follower agent state,
5:     $x_j(k) \ \forall j = \{1, 2, ..., n_i\}, j \neq i$    ▷ subscribe on edge
6:     if $(|\Delta x_j(k)| > \epsilon) \vee (q = 1)$ then
7:         Control update event triggered,
8:         Estimate Kullback-Leibler divergence $KL_i$, (38)
9:         if $|KL_i| > \aleph$ then
10:             Malicious activity detected, DT audit request,
11:             $\widehat{\mathcal{X}}^{des}(h)$    ▷ get *IoT* Shadow
12:             Find diverged neighbours from desired $\widehat{\mathcal{X}}^{des}$
13:             Send reported state to the cloud,
14:             $\mathcal{Z}_{if} = \{\mathcal{Z}_{if}^{\Psi}, \mathcal{Z}_{if}^{\Theta}, \mathcal{Z}_{if}^{\varrho}\}$    ▷ update IoT shadow
15:             Receive the desired state and attacked agent,
16:             $\mathcal{Z}_{if}^{des} = \{\widehat{\mathcal{X}}^{des}(h), \mathcal{F}\}$    ▷ get *IoT* Shadow
17:             Exclude the attacked agent, $\omega_{if,\mathcal{F}} = 0$
18:         else
19:             Neighbours state $x_j(k)$ accepted, $\omega_{if,j} = 1$
20:         Information update until consensus using (13)-(14)
21:         Send new state to neighbours,
22:         $x_{if}(k+1)$    ▷ publish to edge
23:         Send reported state, $\mathcal{Z}_{if}$    ▷ update IoT shadow
24:         Send secured state to $i^f$ primary controller
25:     else
26:         No Update, $x_{if}(k+1) = x_{if}(k)$
27:     $k = k + 1$

FIG. 17

ENERGY CYBER-PHYSICAL SYSTEM DIGITAL TWIN PLAYGROUND

BACKGROUND

The rapid penetration of renewable energy resources (RES) and the recent trend of transportation electrification have increased the growth of networked microgrid (NMG) industries in the energy sector. The recent development of the NMG systems has converted the electrical distribution grid from passive to active networks and transformed consumers into prosumers, which significantly increases the complexity of these systems. The NMG physical system becomes more composite by containing multiple two-way interconnected systems such as distributed energy resources (DERs), energy storage systems (ESSs), flexible loads (as electric vehicles), fixed loads, power electronics converters, transformers, and cables. However, the degree of the cyber system complexity is much greater due to the use of multiple infrastructures, communication protocols, controllers, intelligent electronics devices (LEDs), smart meters, and phasor measurement units. This transforms the modern electric distribution system into a critical energy cyber-physical system (ECPS).

The two-way power flow controllability and the transactive energy capabilities of the NMG depend mainly on a large number of bidirectional power electronic converters, which should have a flexible, fast, and stable response to support the grid during both normal operation and disasters. In order to efficiently and safely operate the NMG, proper management and control methodologies should be developed. Modern networked control systems are linked from the downstream level (nanogrids) to the upstream level (distribution substation), which are considered as an industrial internet of things (IIoT) based communication infrastructure. The IIoT enables the required flexible coordination and integration among the DER's controllers and also improves the overall system management. Being internet of things (IoT) technology-dependent, a large amount of data is harvested from the physical assets' sensors and the cyber assets' controllers, which leads to the efficient operation of the grid and securely minimizes the risk.

Usually, the control system of NMG systems is developed as a hierarchical distributed architecture, which contains primary, secondary, and tertiary control layers. The geographical distribution of the NMG gives incentives to the designers to use a distributed control strategy to reduce the communication bandwidth and ensure plug-and-play flexible installation of the microgrids. Generally speaking, the coordination between agents in a distributed control system usually depends on consensus protocols.

Despite any benefits of distributed control systems, they are more vulnerable to cyber threats. Due to the absence of centric oversight and the low-security level at this layer of the consumer system, an increase in cyber-attacks is inevitable. In these kinds of control systems, the data transaction is typically secured using two methods. The first method is provided by information technology (IT) data encryption and certificate authentication. The second method focuses on the resiliency of the control system itself. However, these methods have many weaknesses and areas for improvement.

BRIEF SUMMARY

There exists a need in the art for a way to address, mitigate, and/or inhibit (or prevent) multiple coordinated attacks on a distributed secondary system and/or tertiary control system. Coordinated attacks can easily disturb the consensus among the distributed controllers. In addition, related art solutions for attempting to mitigate these kinds of attacks include excluding it from the cyber graph, but these cannot solve the problem because the excluded agent might be a vital agent that can disturb an entire microgrid cluster. Also, mixing coordinated attacks on both sensors and controllers, along with a communication network, magnifies the security concerns and imposes a handicap on any industrial internet of things (IIoT) benefits. Embodiments build on a live data-driven model for discovering a coordinated attack and providing autonomous post-attack recovery.

Embodiments of the subject invention provide novel and advantageous systems and methods for enhancing resiliency of a power system against cyber-attacks. An internet of things (IoT)-based digital twin (DT) (e.g., a cloud-based DT platform) for cyber-physical networked microgrids (NMGs) can be implemented to be a centric oversight for the NMG system. A cloud system can host the controllers (cyber things) and the sensors (physical things) of the power system into the cloud IoT core in terms of the IoT shadow. The DT can cover the digital replica for the physical layer, the cyber layer(s), and their hybrid interactions. The framework can ensure the proper and secure operation of the NMG, and it can detect false data injection (FDIA) and denial of service (DoS) attacks on the control system whether they are individual or coordinated attacks. Once an attack is detected, corrective action can be taken (e.g., by the observer), for example based on what-if scenarios that ensure the safe and seamless operation of the NMGs. The DT can include a constructible active model to provide interaction between the defense mechanism and the attackers.

In an embodiment, a system for enhancing resiliency of a power system (comprising a plurality of NMGs) can comprise a processor and a (non-transitory) machine-readable medium in operable communication with the processor and having instructions stored thereon that, when executed by the processor, perform the following steps: receiving data from a cloud server, the data comprising controller data and sensor data of the power system; generating in real-time a DT for the plurality of NMGs based on the controller data and the sensor data received from the cloud server, the DT comprising a physical dynamics model and a cyber dynamics model; monitoring operation of the plurality of NMGs of the DT; and taking corrective action to mitigate any attacks on an NMG of the plurality of NMGs of the DT. The power system can be an energy cyber-physical system (ECPS). The system can further comprise a plurality of intelligent electronic devices (IEDs), each IED of the plurality of IEDs comprising an NMG of the plurality of NMGs. The DT can further comprise a shadow twin of the power system, the shadow twin being configured to perform monitoring functions and launching functions. The DT can further comprise a plurality of agents comprising a leader agent and a plurality of follower agents, the leader agent corresponding to a device of a point of common coupling (PCC). The DT can be an IoT-based DT. The DT can comprise a shadow twin of the power system, the shadow twin comprising a plurality of agents comprising a leader agent and a plurality of follower agents, the leader agent corresponding to a device of a PCC, the follower agents of the plurality of follower agents respectively corresponding to a plurality of IEDs of the power system, and each IED of the plurality of IEDs being coupled to the device of the PCC. The leader agent can be configured to achieve a predetermined common power-sharing factor among the follower agents of the plurality of follower agents. The DT can comprise a constructible active model configured to provide interaction between a defense mechanism of the DT and any attacker of the DT. The taking of corrective action to mitigate any attacks on an NMG of the plurality of NMGs of the DT can comprise: using a Luenberger Observer to construct and test multiple what-if scenarios to authenticate a healthy desired control state of the DT; and returning the DT to the healthy desired control state.

In another embodiment, a method for enhancing resiliency of a power system (comprising a plurality of NMGs) can comprise: receiving (e.g., by a processor) data from a cloud server, the data comprising controller data and sensor data of the power system; generating (e.g., by the processor) in real-time a DT for the plurality of NMGs based on the controller data and the sensor data received from the cloud server, the DT comprising a physical dynamics model and a cyber dynamics model; monitoring (e.g., by the processor) operation of the plurality of NMGs of the DT; and taking (e.g., by the processor) corrective action to mitigate any attacks on an NMG of the plurality of NMGs of the DT. The power system can be an energy cyber-physical system (ECPS). The power system can further comprise a plurality of intelligent electronic devices (IEDs), each IED of the plurality of IEDs comprising an NMG of the plurality of NMGs. The DT can further comprise a shadow twin of the power system, the shadow twin being configured to perform monitoring functions and launching functions. The DT can further comprise a plurality of agents comprising a leader agent and a plurality of follower agents, the leader agent corresponding to a device of a point of common coupling (PCC). The DT can be an IoT-based DT. The DT can comprise a shadow twin of the power system, the shadow twin comprising a plurality of agents comprising a leader agent and a plurality of follower agents, the leader agent corresponding to a device of a PCC, the follower agents of the plurality of follower agents respectively corresponding to a plurality of IEDs of the power system, and each IED of the plurality of IEDs being coupled to the device of the PCC. The leader agent can be configured to achieve a predetermined common power-sharing factor among the follower agents of the plurality of follower agents. The DT can comprise a constructible active model configured to provide interaction between a defense mechanism of the DT and any attacker of the DT. The taking of corrective action to mitigate any attacks on an NMG of the plurality of NMGs of the DT can comprise: using a Luenberger Observer to construct and test multiple what-if scenarios to authenticate a healthy desired control state of the DT; and returning the DT to the healthy desired control state.

BRIEF DESCRIPTION OF DRAWINGS

In FIG. 7($a$), the (turquoise) curve with the lowest $x_i$ value at k=120 is for agent 4; the (red) curve with the second-lowest $x_i$ value at k=120 is for agent 1; the (tan) curve with the third-lowest $x_i$ value at k=100 is for agent 5; and the remaining solid curves are for agents 2, 3, 6, 7, 8, and pcc.

FIG. 7($b$) shows a plot of $Z_i$ versus h, showing response under multiple attacks on multiple agents (in this case, agents 1 and 4) with mitigation. In FIG. 7($b$), the (turquoise) curve with the lowest $Z_i$ value at h=14 is for agent 4; the (orange) curve with the second-lowest $Z_i$ value at h=14 is for agent 1; and the remaining solid curves are for agents 2, 3, 5, 6, 7, 8, and pcc. The dotted curve, which is mostly in line with the curves for agents 2, 3, 5, 6, 7, 8, and pcc, is for desired values.

FIG. 7($c$) shows a plot (left-hand side) of simulated injected power ($P_i$, in kilowatts (kW)) versus h, as well as a plot (right-hand side) of simulated point of common coupling (PCC) voltage ($v_{PCC}$, in Volts (V)) versus h, both showing response under multiple attacks on multiple agents (in this case, agents 1 and 4) with mitigation. In the left-hand plot of FIG. 7($c$), the (turquoise) curve with the lowest $P_i$ value at h=12 is for agent 4; the (brown) curve with the second-lowest $P_i$ value at h=12 is for agent 7; the (dark green) curve with the third-lowest $P_i$ value at h=12 is for agent 8; the (light green) curve with the fourth-lowest $P_i$ value at h=12 is for agent 3; the (light pink) curve with the fifth-lowest $P_i$ value at h=12 is for agent 6; the (orange) curve with the sixth-lowest $P_i$ value at h=12 is for agent 1; the (dark pink) curve with the seventh-lowest $P_i$ value at h=12 is for agent 2; the (tan) curve with the highest $P_i$ value at h=12 is for agent 5; and the dotted curves are for desired values for the respective agents. In the right-hand plot of FIG. 7($c$), the (blue) solid curve is for agent pcc, and the dotted curve is for desired values.

In FIG. 8($a$), the (turquoise) curve with the highest $x_i$ value at k=80 is for agent 4; the (tan) curve with the second-highest $x_i$ value at k=80 is for agent 5; the (light green) curve with the third-highest $x_i$ value at k=80 is for agent 3; the (dark pink) curve with the fourth-highest $x_i$ value at k=80 is for agent 2; and the remaining solid curves are for agents 1, 6, 7, 8, and pcc.

FIG. 8($b$) shows a plot of $Z_i$ versus h, showing response under attack on an agent (in this case, agent 4) and cloud misleading with mitigation. In FIG. 8($b$), the (turquoise) curve with the highest $Z_i$ value at h=14 is for agent 4; the (tan) curve with the highest $Z_i$ value at h=11 is for agent 5; and the remaining solid curves are for agents 1, 2, 3, 6, 7, 8, and pcc. The dotted curve, which is mostly in line with the curves for agents 1, 2, 3, 6, 7, 8, and pcc, is for desired values.

FIG. 8($c$) shows a plot (left-hand side) of simulated injected power ($P_i$, in kW) versus h, as well as a plot (right-hand side) of simulated point of common coupling (PCC) voltage ($v_{PCC}$, in V) versus h, both showing response under attack on an agent (in this case, agent 4) and cloud misleading with mitigation. In the left-hand plot of FIG. 8($c$), the (brown) curve with the lowest $P_i$ value at h=12 is for agent 7; the (dark green) curve with the second-lowest $P_i$ value at h=12 is for agent 8; the (light green) curve with the third-lowest $P_i$ value at h=12 is for agent 3; the (light pink) curve with the fourth-lowest $P_i$ value at h=12 is for agent 6; the (dark pink) curve with the fifth lowest $P_i$ value at h=12 is for agent 2; the (turquoise) curve with the sixth-lowest $P_i$ value at h=12 is for agent 4; the (tan) curve with the seventh-lowest $P_i$ value at h=12 is for agent 5; the (orange) curve with the highest $P_i$ value at h=12 is for agent 1; and the dotted curves, are for desired values for the respective agents. In the right-hand plot of FIG. 8(c), the (blue) solid curve is for agent pcc, and the dotted curve is for desired values.

In FIG. 10(a), the (blue) curve with the lowest $x_i$ value at k=160 is for agent pcc; the (light pink) curve with the lowest $x_i$ value at k=100 is for agent 6; and the remaining solid curves are for agents 1, 2, 3, 4, 5, 7, and 8.

In FIG. 10(b), the (blue) curve with the highest $Z_i$ value at h=9 is for agent pcc; the (light pink) curve with the lowest $Z_i$ value at h=12 is for agent 6; the (dark pink) curve with the lowest $Z_i$ value at h=13 is for agent 2; and the remaining solid curves are for agents 1, 3, 4, 5, 7, and 8. The dotted curve is for desired values.

In FIG. 12(a), the (yellow) curve with the lowest $x_i$ value during the 2 s delay is for agent 2; the (light green) curve with the second-lowest $x_i$ value during the 2 s delay is for agent 5; the (dark pink) curve with the third-lowest $x_i$ value during the 2 s delay is for agent 4; the (turquoise) curve with the fourth-lowest $x_i$ value during the 2 s delay is for agent 3; and the remaining curves are for agents 1, 6, 7, 8, and pcc.

In FIG. 12(b), the (yellow) curve with the lowest $x_i$ value during the 2 s delay is for agent 2; the (light green) curve with the second-lowest $x_i$ value during the 2 s delay is for agent 5; the (dark pink) curve with the third-lowest $x_i$ value during the 2 s delay is for agent 4; the (turquoise) curve with the fourth-lowest $x_i$ value during the 2 s delay is for agent 3; and the remaining curves are for agents 1, 6, 7, 8, and pcc.

FIG. 14 shows an algorithm (which can be referred to herein as "Algorithm 1") that can be used with embodiments of the subject invention.

FIG. 15 shows an algorithm (which can be referred to herein as "Algorithm 2") that can be used with embodiments of the subject invention.

FIG. 16 shows an algorithm (which can be referred to herein as "Algorithm 3") that can be used with embodiments of the subject invention.

FIG. 17 shows an algorithm (which can be referred to herein as "Algorithm 4") that can be used with embodiments of the subject invention.

In FIG. 26(a), the (turquoise) curve with the lowest $x_i$ value at k=120 is for agent 4; the (red) curve with the second-lowest $x_i$ value at k=120 is for agent 1; the (tan) curve with the second-lowest $x_i$ value at k=80 is for agent 5; and the remaining solid curves are for agents 2, 3, 6, 7, 8, and pcc.

In FIG. 26(b), the (turquoise) curve with the lowest $Z_i$ value at h=14 is for agent 4; the (red)

curve with the second-lowest $Z_i$ value at h=14 is for agent 1; and the remaining solid curves are for agents 2, 3, 5, 6, 7, 8, and pcc. The dotted curve, which is mostly in line with the curves for agents 2, 3, 5, 6, 7, 8, and pcc, is for desired values.

Figures 30A, 30B, 30C:
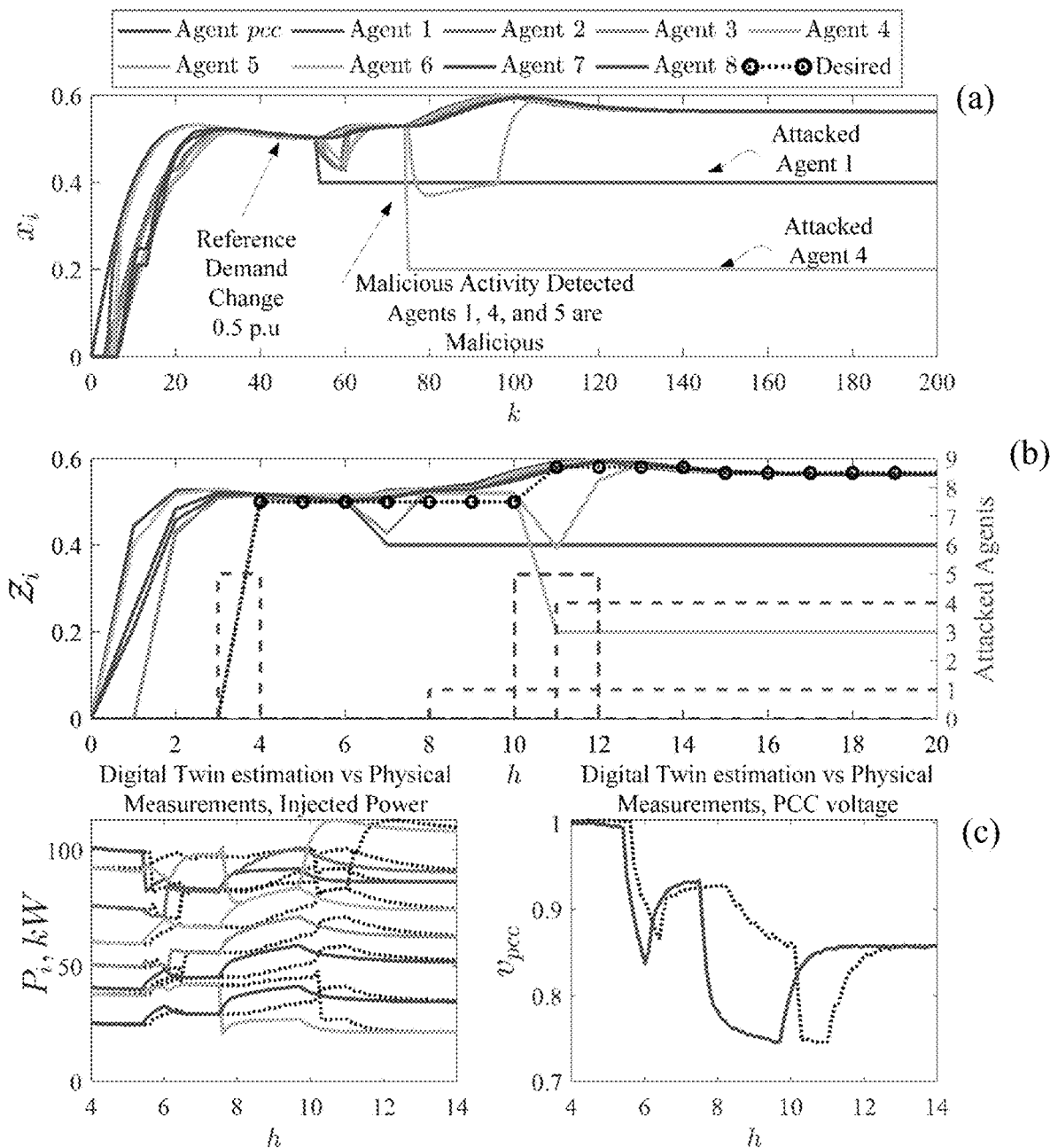
FIG. 30(a) shows a plot of $x_i$ versus k, showing response under multiple false data injection attacks (FDIAs) on multiple secondary agents (SCAs; in this case, agents 1 and 4), in which the DT security auditing detected and mitigated such attacks.
FIG. 30(b) shows a plot of $Z_i$ versus h, showing response under multiple FDIAs on multiple SCAs (in this case, agents 1 and 4), in which the DT security auditing detected and mitigated such attacks.

FIG. 30(c) shows a plot (left-hand side) of DT estimation of injected power ($P_1$, in kW) versus h, as well as a plot (right-hand side) of DT estimation of PCC voltage ($v_{PCC}$, in Volts (V)) versus h, both showing response under multiple FDIAs on multiple SCAs (in this case, agents 1 and 4), in which the DT security auditing detected and mitigated such attacks. In the left-hand plot of FIG. 26(c), the (turquoise) curve with the lowest $P_i$ value at h=12 is for agent 4; the (brown) curve with the second-lowest $P_i$ value at h=12 is for agent 7; the (dark green) curve with the third-lowest $P_i$ value at h=12 is for agent 8; the (light green) curve with the fourth-lowest $P_i$ value at h=12 is for agent 3; the (light pink) curve with the fifth-lowest $P_i$ value at h=12 is for agent 6; the (red) curve with the sixth-lowest $P_i$ value at h=12 is for agent 1; the (dark pink) curve with the seventh-lowest $P_i$ value at h=12 is for agent 2; the (tan) curve with the highest $P_i$ value at h=12 is for agent 5; and the dotted curves are for physical measurements for the respective agents. In the right-hand plot of FIG. 26(c), the (blue) solid curve is for agent pcc, and the dotted curve is for physical measurements.

DETAILED DESCRIPTION

Embodiments of the subject invention provide novel and advantageous systems and methods for enhancing resiliency of a power system (e.g., an energy cyber-physical system (ECPS)) against cyber-attacks. An internet of things (IoT)-based digital twin (DT) (e.g., a cloud-based DT platform) for cyber-physical networked microgrids (NMGs) can be implemented to be a centric oversight for the NMG system. A cloud system can host the controllers (cyber things) and the sensors (physical things) of the power system into the cloud IoT core in terms of the IoT shadow. The DT can cover the digital replica for the physical layer, the cyber layer(s), and their hybrid interactions. The framework can ensure the proper and secure operation of the NMG, and it can detect false data injection (FDIA) and denial of service (DoS) attacks on the control system whether they are individual or coordinated attacks. Once an attack is detected, corrective action can be taken (e.g., by the observer), for example based on what-if scenarios that ensure the safe and seamless operation of the NMGs. The DT can include a constructible active model to provide interaction between the defense mechanism and the attackers.

Embodiments of the subject invention provide IoT-based digital clones of an ECPS that can serve many applications in the power system, including monitoring, resilient control, management, security, situational awareness, and/or planning. The framework can create a DT of the physical power system components, the cyber control layer, and their interaction(s) in real-time. The framework can provide the power system with reliable, efficient, and secure operations during the normal state and make the system survivable against catastrophic risks. The framework can leverage the emerging IoT and cloud computing technologies to create a safe playground to test, validate, plan, and/or study new ideas in a realistic simulation system. Unlimited applications can be implemented for the power system to run in parallel, which gives the ECPS the ability to follow the Industry 4.0 revolution and achieve power grid digitalization. The DT playground can be a real-time digital clone of the power system that holds both the last power system state and data-informed ECPS dynamic models to mimic the power system behavior. This can give the grid operator the ability to monitor, operate, secure, design, test, validate, plan, and/or study the current and future energy cyber-physical system.

DT playground platforms of embodiments of the subject invention can replace the old supervisory control and data acquisition (SCADA) system that lacks the ability to respond in real-time for outage management and many operation challenges. The DT constructor engine can autonomously create the DT in real-time according to the application. Embodiments introduce for the first time an integrated platform that uses the latest technologies (e.g., IoT and cloud computing) to create a digital replica for a physical power system, cyber system, and real-time transactions; this is an improvement over the related art, which only introduces an isolated physical component twin. The framework of embodiments of the subject invention can provide the power system with the centric oversight for the networked control system, which can ensure system reliability, efficiency, security, and resiliency. Embodiments of the subject invention also provide a safe realistic simulator environment for both the grid operator and planner, who can use it to create short-term and long-term plans with real-time data-informed models.

Embodiments of the subject invention use the concept of DT to secure one or more NMGs. The IoT shadow and cyber-physical DT can be formulated mathematically. Practical resilient control algorithms can be provided that are able to detect and mitigate FDIA attacks. Cloud-based services can be deployed to provide an IoT based implementation of the DT. The interaction between the cloud-based services and the physical entities of the control system can be validated.

IoT technologies and cloud computing advancements encourage the energy sector to utilize this digital transformation for a better understanding and improvement of energy system operation. The DT technology of embodiments of the subject invention can take advantage of the benefits of the IIoT, ECPS, models and advanced data analytics to understand what is happening and what will happen for the ECPS. The DT is defined as a digital replica/model that includes the last information matching a thing.

Figure 1:
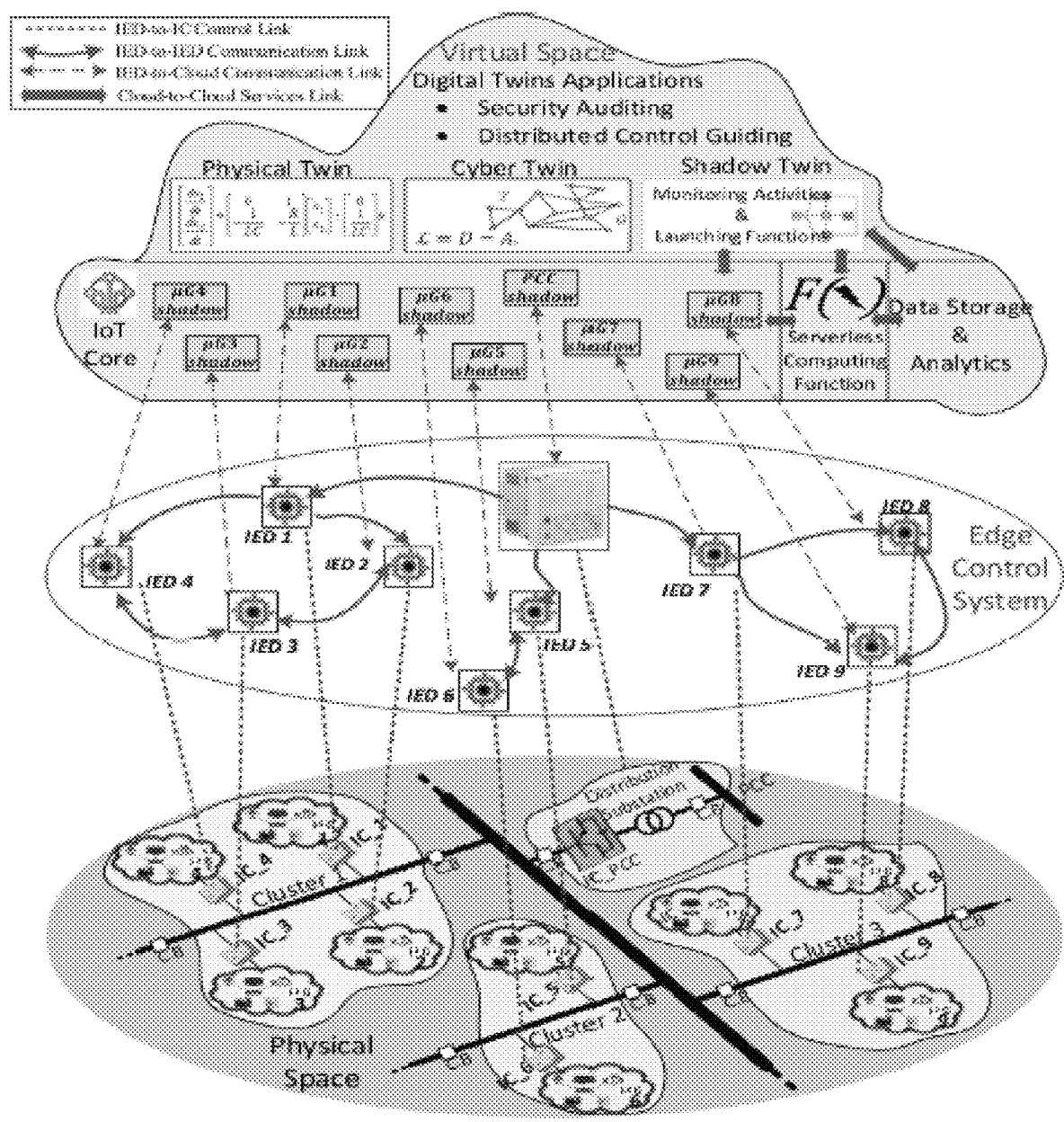
FIG. 1 shows a schematic view of an architecture that can be used with embodiments of the subject invention.

FIG. 1 shows a schematic view of the DT architecture, according to an embodiment of the subject invention. The NMG (physical assets) under study is a direct current (DC) NMG (DCNMG) system in the physical space in the lower layer. The physical system is constructed by n interconnected DC microgrid clusters where each cluster contains m DCNMGs. The interconnected clusters are connected to a main medium voltage DC (MVDC) bus. The NMG is aggregated at the point of common coupling (PCC) with a grid through an interlinking DC/alternating current (AC) inverter and a step-up transformer. The primary controllers are assumed to be a part of the physical system as they are mainly responsible for the local control of the converters. In the second layer, the edge control system includes the distributed controllers and the tertiary controller. The secondary controllers are communicating and coordinating via cyber combination intelligent electronics device (IED)-to-IED links to satisfy the objective control rule that is received from the tertiary controller at the PCC. The tertiary control agent can send the required reference power-sharing factor to the leaders of the secondary controllers for each cluster of microgrids. Then, the leader can send the control law to the cluster follower agents by the consensus protocol to make an agreement on the leader state. The control objective is to guarantee equal relative power-sharing among microgrids. A failure in ensuring the control objective due to a communication failure or a cyber-attack causes unfair power-sharing and can disturb/collapse the voltage regulation at the PCC. Because the NMG is ruled by the balancing between the NMGs power and the PCC power, the physical DT can be implemented to represent the real-time balancing according to the physical living model of the interconnected system.

In addition, the cyber DT can represent the multi-agent consensus convergence rules to guarantee the matching between the tertiary control system and the secondary control system. The hybrid cyber physical system (CPS) replica can enhance the centric oversight by ensuring that the mismatch between the cyber and physical system components decays to zero. If the mismatch between the DT and the real-time measurements exists, the CPS failure or an attack can be detected, estimated, and mitigated. Both the physical system states and the cyber control agents are connected to the virtual layer (cloud system) through the IoT core as a shadow of things. The shadows of the things have the last states of the controllers/sensors, which are updated periodically by the edge controller to notify the cloud of the new states. A service-less computing function can be utilized to launch certain applications/measures according to the status of the shadow states. An advantage of embodiments is the resiliency of the NMG against cyber-attacks on the physical sensors and/or control agents.

The degree of complexity and the accuracy of the DT can be determined according to the application and the type of analysis or the outputs that are required to be implemented. In some embodiments, DTs can discover the physical balancing mismatch, the cyber control system convergence, and the hybrid CPS consistency.

The intra-microgrid dynamics can be ignored for the control system if the objective is the power transaction and the power balancing rule among the microgrids and the PCC. The implemented physical twin model can therefore emphasize mainly the bidirectional DC/DC converters because they are the things that control the power flow transaction and regulate the system parameters.

Generally, the DCNMG dynamics of $i^{th}$ microgrids can be described by, $$L_i \frac{d\bar{I}_i}{dt} = E_i^* - r_i \bar{I}_i - v_i^t \quad \quad (1)$$
$$C_i \frac{dv_i^t}{dt} = \bar{I}_i - I_i^t$$

where I(bar), is the $i^{th}$ microgrid converter average inductor current, $E_i^*$ is the reference voltage at the $i^{th}$ microgrid $v_i^t$ is the microgrid terminal voltage and $I_i^t$ is the transmitted current from/to microgrid i to the grid. In addition, $R_i$, $L_i$, and $C_i$ are the equivalent resistance, inductance, and capacitance, respectively, of each microgrid.

It is assumed that the microgrid output is controlled by the reference signals of the terminal voltage $v_i^{t,ref}$ and the output reference power $P_i^{ref}$ using the droop control characteristics as follows, $$E_i^* = V_i^{t,ref} - k_i(P_i^{ref} - P_i) \quad \quad (2)$$

where $k_i$ is droop coefficient and the output power can be represented in terms of power-sharing factors $P_i = P_{i,max} x_i$. Therefore, if $\beta_i = k_i P_{i,max}$, the controlled voltage in Equation (2) can be rewritten as, $$E_i^+ = V_i^{t,ref} - \beta_i(x_i^{ref} - x_i) \quad \quad (3)$$

The microgrid terminal $t_i$ is connected to the distribution grid nodes $g_j$, which has voltages $v_o^g = [v_o^g, \ldots, v_m^g]$ and the transmitted current to the grid nodes can be described as, $$I_i^t = \sum_{jCm} I_j^g = \sum_{jCm} y_{ij}^{tg}(v_i^t - v_j^g) \quad \quad (4)$$

where $y_{ij}^{tg}$ is the line or cable admittance between the nodes $t_i$ and $g_j$. If the balancing and power flow is the purpose of the model, the electromagnetic transients can be ignored, which leads that the grid interconnection model is represented as follows, $$\begin{bmatrix} I^t \\ I^g \end{bmatrix} = \begin{bmatrix} Y^{tt} & Y^{tg} \\ Y^{gt} & Y^{gg} \end{bmatrix} \begin{bmatrix} V^t \\ V^g \end{bmatrix} \quad \quad (5)$$

According to Equations (1) and (3)-(5), the balancing dynamics in matrix notation can be written as, $$L \frac{d\bar{I}}{dt} = V^{t,ref} - \beta X^{ref} - R\bar{I} - V^t \quad \quad (6)$$
$$C \frac{dV^t}{dt} = \bar{I} - I^t$$
$$I^t = Y^{tt} V^t + Y^{tg} V^g$$
$$I^g = Y^{gt} V^t + Y^{gg} V^g$$

where the power sharing states are $X^{ref} = [x_1^{ref}, \ldots, x_n^{ref}]^T$, and the reference terminal voltages are $V^{t,ref} = [v_1^{t,ref}, \ldots, v_n^{t,ref}]^T$. In order to ensure the equilibrium of the dynamics, Equation (6) is analyzed in steady-state such that $V^t = V^{t,ref} - \beta X^{ref} - RI^t$ as, $$I^t = Y^{tt} V^{t,ref} - \beta Y^{tt} X^{ref} - R Y^{tt} I^t + Y^{tg} V^g \quad \quad (7)$$
$$I^g = Y^{gt} V^{t,ref} - \beta Y^{gt} X^{ref} - R Y^{gt} I^t + Y^{gg} V^g$$

whose re-arranging yields, $$I^t = \left(Y^{tt-1} + R\right)^{-1} V^{t,ref} - \beta\left(Y^{tt-1} + R\right)^{-1} X^{ref} + \quad \quad (8)$$
$$Y^{tg}(1 + RY^{tt})^{-1} V^g$$
$$I^g = \left(Y^{gt} - Y^{gt} R\left(Y^{tt-1} + R\right)^{-1}\right) V^{t,ref} -$$
$$\left(\beta Y^{gt} - Y^{gt} R \beta\left(Y^{tt-1} + R\right)^{-1}\right) X^{ref}$$
$$\left(Y^{gg} - Y^{gt} Y^{tg} R(1 + RY^{tt})^{-1}\right) V^g$$

The system achieves the equilibrium if the controller values $V^{t,ref}$ and $X^{ref}$ are chosen to guarantee that the system in Equation (6) is solvable. A physical asset $\phi \in \Phi$ is represented by the physical set of states, which is measured by a sensor $\psi \in \Psi$. The physical system is represented in state-space form as, $$\left.\begin{array}{l}\dot{X}^\Phi = A^\Phi X^\Psi + B^\Phi U^\Psi \\ Y^\Phi = C^\Phi X^\Psi\end{array}\right\} \quad (9)$$

where the physical system states are $X^\Psi=[I,V^t]^T$, and the inputs are $U^\Psi=[V^{t,ref}, X^{ref}, I^t]^T$. The physical system dynamical parameters are derived from Equation (6) as follows, $$A^\Phi = \begin{bmatrix} -RL^{-1} & -L^{-1} \\ C^{-1} & 0_n \end{bmatrix}, C^\Phi = [I_n] \quad (10)$$

$$B^\Phi = \begin{bmatrix} L^{-1} & -\beta L^{-1} & 0_n \\ 0_n & 0_n & -C^{-1} \end{bmatrix}.$$

Figure 2:
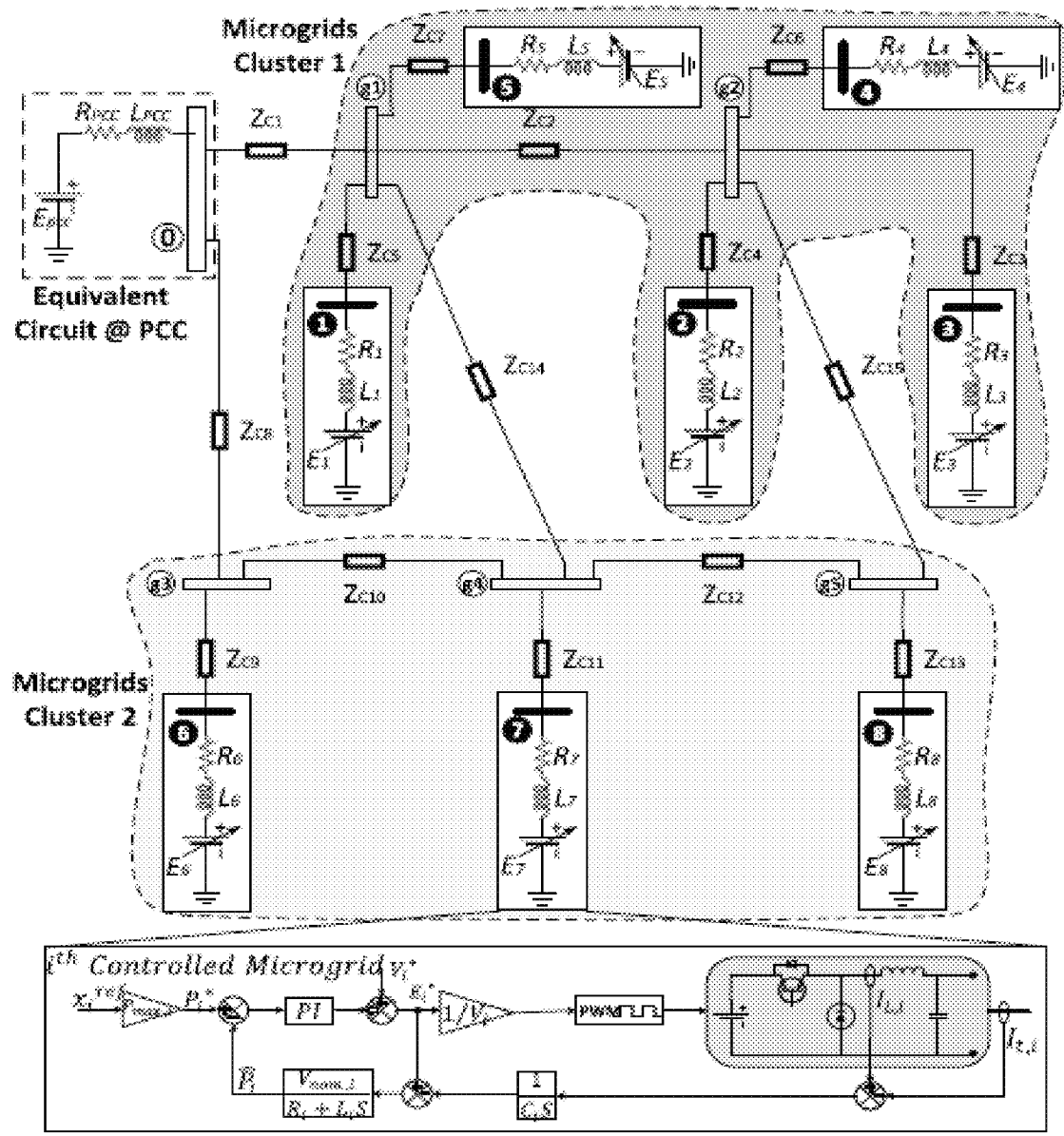
FIG. 2 shows a schematic view of a networked microgrid (NMG) equivalent circuit for a physical system model, according to an embodiment of the subject invention.

As an illustration, the NMG system under study includes DC microgrids with two microgrids clusters, which are interconnected by $z_c$ tie-lines. As shown in FIG. 2, the first cluster has five microgrids and the second cluster has three microgrids. The two clusters are connected to the PCC by the lines $z_{c1}$, $z_{c8}$. Each microgrid has a bidirectional DC/DC converter and the controlled variables are the voltages, which should be maintained at 1 p.u. and the power-sharing factor that is provided by the secondary control layer.

The distribution system that contains the NMG can be considered as a virtual power plant. The aggregated power from the NMG is controlled by the tertiary controller at PCC (leader) and the multi-agent cooperated controllers at each microgrid (followers) (see also Liu et al., An attack-resilient cooperative control strategy of multiple distributed generators in distribution networks, IEEE Trans. Smart Grid, vol. 7, no. 6, pp. 2923-2932, November 2016; Sahoo et al., An adaptive event-triggered communication based distributed secondary control for DC microgrids, IEEE Trans. Smart Grid, vol. 9, no. 6, pp. 6674-6683, November 2018; Abhinav et al., Synchrony in networked microgrids under attacks, IEEE Trans. Smart Grid, vol. 9, no. 6, pp. 6731-6741, November 2018; Dehkordi et al., Distributed resilient adaptive control of islanded microgrids under sensor/actuator faults, IEEE Trans. Smart Grid, vol. 11, no. 3, pp. 2699-2708, May 2020; Duan et al., A resilient consensus-based distributed energy management algorithm against data integrity attacks, IEEE Trans. Smart Grid, vol. 10, no. 5, pp. 4729-4740, September 2019; and Gooi et al., A secure distributed transactive energy management scheme for multiple interconnected microgrids considering misbehaviors, IEEE Trans. Smart Grid, vol. 10, no. 6, pp. 5975-5986, November 2019; all of which are hereby incorporated by reference herein in their entireties). The PCC tertiary controller objective is to satisfy the energy management optimal update, which is the reference power-sharing $P_{pcc}^{ref}$ by aggregating it from the NMGs sharing $P_i$. Because the NMG contains different scales of microgrids, the sharing capability of each microgrid is different. Therefore, the PCC agent (agent 0) is described by the sharing factor $x_0 = P_0/P_{0,max}$ and each microgrid sharing capability is defined as $x_i = P_i/P_{i,max}$. The PCC agent control objective is to achieve certain reference common power-sharing factor as follows, $$\min_x (x_0^{ref} - x_0(x_i)) \quad (11)$$

s.t. $0 \leq x_0 \leq 1, 0 \leq P_0 \leq P_{0,max}$ where $P_{0,max}$ is the maximum power-sharing capability at the PCC.

Figure 3:
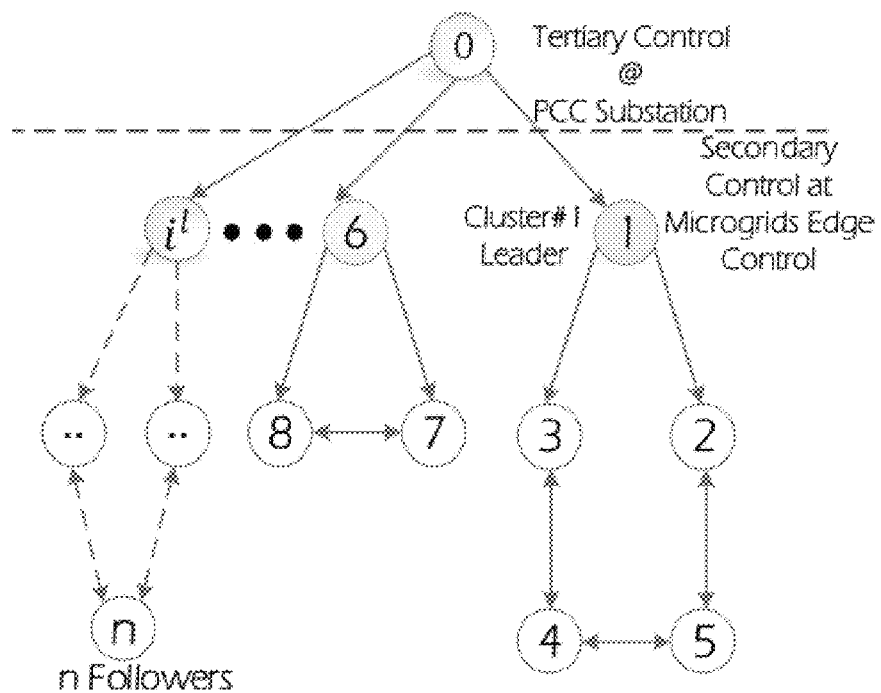
FIG. 3 shows a schematic view of an NMG cyber graph topology.

The secondary distributed controllers cooperate to achieve a consensus on the main leader control objective. According to the graph theory, the cyber communication is a graph $G=(\mathcal{V},\varepsilon)$ that determines the cyber state coupling of the agents' dynamics where $\mathcal{V}=\{0, 1, \ldots, n\}$ is the vertex set with a set of edges $\varepsilon \subseteq v \times v$ is the coupling between the control agents. FIG. 3 shows the communication network cyber graph topology. Agent 0 is the main leader for the system, and it is connected to the leaders of microgrids clusters $i^1$, which is connected to several i followers.

The edge $(i, j) \in \varepsilon$ represents that the cyber state of the $i^{th}$ agent will influence the dynamics of the $j^{th}$ agent according to weighing factor $w_{ij}$, which is represented as a global adjacency matrix $A \in \mathbb{R}^{(n+1) \times (n+1)}$ (see also Shabestary et al., Autonomous coordinated control scheme for cooperative asymmetric low-voltage ride-through and grid support in active distribution networks with multiple DG units, IEEE Trans. Smart Grid, vol. 11, no. 3, pp. 2125-2139, May 2020; which is hereby incorporated by reference herein in its entirety; as well as Abhinav et al. (supra.), Dehkordi et al. (supra.), and Duan et al. (supra.)), $$[\mathcal{A}]_{ij} = \begin{cases} w_{ij} > 0 & \text{if } i, j \in \varepsilon \\ 0 & \text{otherwise} \end{cases} \quad (12)$$

The graph Laplacian matrix is defined as $\mathcal{L}=\mathcal{D}-\mathcal{A}$, were $\mathcal{D}=\text{diag}\{d_i\}$, is the in-neighbors degree matrix and $d_i = \Sigma_{j \in n_i} w_{ij}$.

Remark 1: the leader-follower consensus protocol can be implemented in the following discrete-time form for $k^{th}$ samples to achieve an agreement on the steady-state control leader such that $\lim_{k \to \infty} \bar{x}_i(k) = x_0^{ref} \forall i \in n$ $$\delta_{ij}(k+1) = \delta_{ij}(k) + w_{ij}(x_j(k) - x_i(k)) \quad (13)$$

$$x_i(k+1) = c \cdot \delta_{ij}(k+1) + g_i \cdot x_0 \quad (14)$$

where $\delta_{ij}$ is an intermediate updating of the control law for an agent i by $j^{th}$ neighbors, c is a constant to regulate the consensus speed and $g_i$ is the pinning gain, which characterizes the spanning tree at the leader.

The dynamics of the consensus protocol can be modeled as a set of interacting agents that achieve a common goal $x_0$. The local neighborhood tracking error $e_i$ of a controller i is formulated as, $$e_i = \dot{x}_i = \sum_{j \in n_i} w_{ij}(x_j - x_i) + g_i \cdot (x_0 - x_i) \quad (15)$$

The leader takes the role of controlling the graph in a distributed manner using the consensus protocol $u_i = \iota e_i$, where $\iota$ is a constant gain, which is chosen to ensure the synchronization among agents. The synchronization error with the leader can be represented as $\delta_i = x_i - x_0$. The consensus is achievable under the input $u_i$ to the leader state $x_0$ and the synchronization error with the leader is decaying to zero, $\delta_i \to 0$ if the dynamical matrix of the cyber graph is stabilizable. The global dynamical error under the control mechanism $u_i$ can be formulated as, $$\begin{aligned}\delta &= \dot{X} - \dot{X}_0 \\ &= ((I_n \otimes \mathcal{A}) - \iota(\mathcal{L}+G))\delta \\ &= A^c \delta\end{aligned} \quad (17)$$

where $A^c$ represents the error closed dynamical matrix. The solution is written as, $$\delta(t) = e^{A^c t} \delta(0) \quad (18)$$

A cyber thing θ represents a controller state $x^A \in X^\Theta$, which uses the sensor measurement and the cyber graph G to control the physical asset φ. The cyber system dynamics is given by, $$\begin{aligned}\dot{X}^\Theta &= A^\Theta X^\Theta + B^\Theta U^\Theta \\ Y^\Theta &= C^\Theta X^\Theta\end{aligned} \quad (19)$$

where the cyber states $X^\Theta = X^{ref}$, the graph control input $U^\Theta = X_O$, the cyber system dynamics are $A^\Theta = -(\mathcal{L}+G)$, and $B^\Theta = \iota G\underline{1}$, $C\Theta = 1_n$.

The IoT cyber edge system is vulnerable to different types of attacks that can threaten the communication links or the controllers itself. A cyber-attack against control system is usually classified into three different properties/resources available for the attack: model knowledge; disclosure resources; and disruptive resources. The following two assumptions hold (labeled as "Assumption 1" and "Assumption 2").

Assumption 1: An attacker can acquire at least the local data to launch an attack to disturb the consensus. Also, the link between the secondary and primary controller is a part of the local controller. An attack launched on the PCC agent or its communication link with the leaders can mislead the entire distribution system. Also, if an attacker knows the distributed control systems, consensus protocol and the network topology, the attacker can launch multiple coordinated attacks, which can easily mislead the distributed observers.

Assumption 2: If an attack was successfully launched on the PCC agent or the leader agents of clusters and the attack is detected, the isolation of the attacked agent cannot retrofit the consensus as that will exclude also the healthy follower agents.

Mathematically, the attack on the controller can be on the control actuator signal to the physical system and/or on the cyber graph states as follows, $$\begin{aligned}u_i^f &= u_i + \gamma_i u_i^a \\ x_i^f &= x_i + \alpha_i x_i^a\end{aligned} \quad (20)$$

where $u_i$, $u_i^f$ of are the healthy and the attacked actuator signals, respectively, to the physical system. Also, $x_i$, $x_i^f$ are the healthy and faulty states, respectively, sent to neighborhood controllers from the physical system. The Boolean signals $\gamma_i, \alpha_i$ represent the presence of the attack vector $u_i^a$, $x_i^a$.

Theorem 1: Suppose the cyber system (Equation (19)) is under attack (Equation (20)) and let Assumptions 1-2 be applied. If an agent i is attacked, then for all intact agents $j^{th}$, the tertiary control objective cannot be satisfied.

Proof of Theorem 1: According to the attack model of Equation (20) and by applying the error dynamics of Equation (15) and substituting in the cyber system of Equation (19), the combined system dynamics is represented as, $$\begin{aligned}\dot{x}_i^\theta &= A^\theta x_i^\theta + B^\theta u_i^\theta + B^\theta \xi_i^\theta \\ \xi_i^\theta &= \gamma_i u_i^a - \iota\left(\sum_{j \in n_i} w_{ij}(\alpha_i x_i^a - \alpha_j x_j^a) + g_i \alpha_i x_i^a\right)\end{aligned} \quad (21)$$

By calculating the error dynamics with respect to the leader state and rewriting Equation (21) in matrix form, $$\begin{aligned}\delta &= \dot{X} - \dot{X}_0 = A^c \delta + (I_n \otimes B^\theta)\xi^\theta \\ \xi^\theta &= -\iota(\mathcal{L}+G)(\alpha \otimes I_n)X^a + (\alpha \otimes I_n)U^a\end{aligned} \quad (22)$$

by combining Equations (17) and (22), the error dynamics becomes, $$\dot{\delta} = A^c \delta - \iota(I_n \otimes B^\theta)(\mathcal{L}+G)(\alpha \otimes I_n)X^a + (I_n \otimes B^\theta)(\alpha \otimes I_n)U^a \quad (23)$$

let the attack be launched at time T, the solution of Equation (23) is, $$\delta(t) = e^{A^c t} \delta(0) + \int_0^t e^{A^c(t-\tau)} X^a d\tau + \int_0^t e^{A^u(t-\tau)} U^a d\tau \quad (24)$$

However, the first term is decaying to zero, the second and the third terms are nonzero, and their steady-state values depend on the attack vectors alongside cyber system connectivity. Therefore, the PCC control objective cannot be satisfied. This is the end of the proof of Theorem 1.

The CPS hybrid models can be combined into a single concatenation dynamical model from both systems of Equations (9) and (19) to represent the overall system behavior. The series concatenation operation can be performed (see also Climent et al., Series concatenation of 2D convolutional codes, in Proc. IEEE 9th Int. Workshop Multidimensional (nD) Syst. (nDS), 2015, pp. 1-6; which is hereby incorporated by reference herein in its entirety). The hybrid system model is represented as, $$\begin{bmatrix}\dot{X}^\Theta \\ \dot{X}^\Psi\end{bmatrix} = \begin{bmatrix}A^\Theta & 0 \\ B^\Phi C^\Theta & A^\Phi\end{bmatrix}\begin{bmatrix}X^\Theta \\ X^\Psi\end{bmatrix} + \begin{bmatrix}B^\Theta \\ 0\end{bmatrix}[U^\Theta] \quad (25)$$

$$[Y^{\Theta\Psi}] = [0 \quad C^\Phi]\begin{bmatrix}X^\Theta \\ X^\Phi\end{bmatrix} \quad (26)$$

where $Y^{\Theta\Psi}$ is the hybrid model output.

The shadow states represent the monitored cyber and physical states for provisioning the CPS activity every h time instant. A chosen physical sensor ψ transmits its local microgrid measurements to the virtual space (cloud) and the transmitted state is subjected to noise $\sigma^\Psi$. The shadow of the physical states $\Xi^\Psi$ is provisioned by matrix $S^\Phi$ as follows, $$z^\Psi(h) = S^\Phi C^\Phi X^\Psi(h) + \sigma^\Psi(h) \quad (27)$$

Similarly, the cyber system controller state φ is reported as a cyber shadow state $\Xi^\Theta$ to the cloud by provisioning matrix $S^\Theta$ as follows, $$\Xi^\Theta(h) = S^\Theta C^\Theta X^\Theta(h) + \sigma^\Theta(h) \quad (28)$$

where the transmitted data has noise $\sigma^\Theta$.

Figure 4:
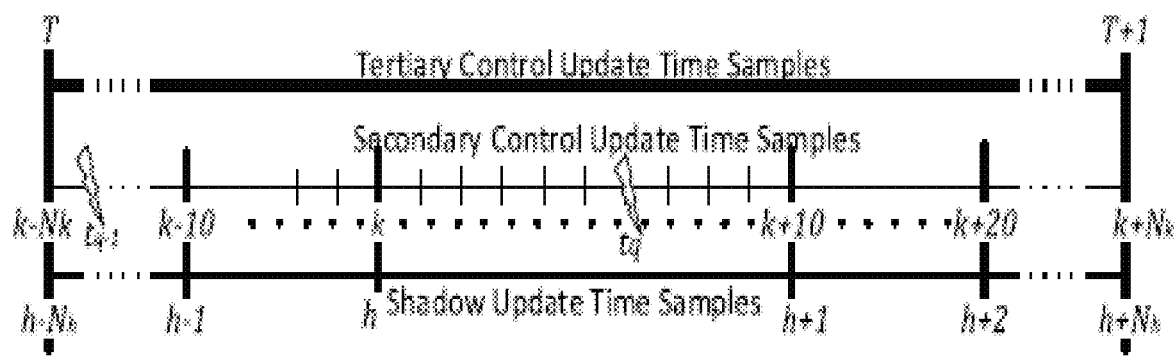
FIG. 4 shows a timeline of overall time-scales discrimination.

In addition to the periodic shadow update every sample time h, the occurrence of an event q is assumed to update the shadow to $\mathcal{Z}(t_q)$ that has the following representation, $$z_i(h)=[z_i(t_q-1),z_i(t_q),t_q-1,t_q,z_Q(t_q)] \quad (29)$$

where $t_{q-1}$, $t_q$ are the times of the last two consequence events and $\mathcal{Z}^o(t_q)$ is the reported malicious neighbor agents of the $i^{th}$ agent. FIG. 4 shows the discrimination between the different time scales of secondary, tertiary, and shadow updating rates.

The tertiary controller and the secondary controllers update the control input every T and k time instances, respectively. The shadow updates occur every h time instance and/or every event trigger instant $t_q$. In order to monitor the security of the system activity and reduce the communication burden with the cloud system, the shadow update is assumed to be T>>h>k during the normal periodic update.

Using the Luenberger Observer (LO), multi-what-if scenarios can be constructed and tested to authenticate the healthy desired control state. Given the linear system, which represents the dynamics of the CPS in Equations (9), (19), (25), and (26), the LO is constructed firstly for the full healthy state as, $$\hat{\mathcal{X}}_i(h+1) = \Lambda \hat{\mathcal{X}}_i(h) + \Gamma \mathcal{U}_i(h) + \ell_i(\mathcal{Y}_i(h) - \hat{\mathcal{Y}}_i(h))$$
$$\hat{\mathcal{Y}}_i(k) = \Upsilon \hat{\mathcal{X}}_i(h) \quad (30)$$

where $\hat{x}_i$ is the estimated state that is calculated according to the control input $U_i$ and the measurement $\mathcal{Y}_i$. The LO is constructed by assigning the control input and the measured output based on the shadow states of the cyber and physical systems such that $\Lambda$ and $\Upsilon$ are full ranked. According to the real-time CPS topology, the observer parameters, $\Delta$ and $\Upsilon$, are built to represent the last shadow state. The LO gain $\ell i$ is selected such that the eigenvalues of $(\Lambda - l\Upsilon)$ is stabilizable. During the normal healthy operation, the observer input is set to the desired state at the PCC, $U_i(h)=Z_0(h)$ and the observer measured output is set to the reported shadow states $Y_i(h)=Z_i(h)$. Also, the observation error $\|Z_i(h) - \mathcal{O}_i \hat{x}_i(h)\|_2^2$ is decaying to zero, where $\mathcal{O}_i = [\Upsilon_i, \Upsilon_i\Lambda, \ldots, \Upsilon_i\Lambda^{t-1}]^T$ is the block of the output parameter for the set of shadow states during time period t. The LO observer is rewritten as, $$\hat{\mathcal{X}}_i(h+1) = \tilde{\Lambda}\hat{\mathcal{X}}_i(h) + \tilde{\Gamma}\tilde{\mathcal{U}}_i(h)$$
$$\tilde{\Lambda} = \Lambda - \ell_i \Upsilon_i$$
$$\tilde{\Gamma} = [\Gamma \ \ell_i]$$
$$\tilde{\mathcal{U}}_i = [\mathcal{Z}_0 \ \mathcal{Z}_i]^T \quad (31)$$

If a set of the observed states are non-decaying to zero error, these states' indices are recorded in $\varrho$. Then, the LO is reconstructed to checking the satisfiability such that, $$\lim_{h \to \infty} supp \|\mathcal{Z}_i(h) - O_i \hat{\mathcal{X}}_i(h)\|_2^2 \leq TH \quad (32)$$

or constant TH, which is selected based on the composite noise from the cyber edge to the cloud. The observer gain $l_i$ is chosen such that $\tilde{\Lambda}$ has the characteristic polynomial $d(s)=s^n+\alpha_1 s^{n-1}+ \ldots +\alpha_n$ of the healthy case. In order to guarantee that condition, a linear coordination transformation of the observer parameter matrices can be applied (see also Proposition 2.3 in De Schutter et al., Minimal state-space realization in linear system theory: An overview, J. Comput. Appl. Math., vol. 121, nos. 1-2, pp. 331-354, 2000; which is hereby incorporated by reference herein in its entirety) as $$\tilde{\Lambda}^t = I_n \otimes \begin{bmatrix} -a_1 & -a_2 & \ldots & -a_{n-1} & -a_n \\ 1 & 0 & \ldots & 0 & 0 \\ 0 & 1 & \ldots & 0 & 0 \\ \vdots & \vdots & \ddots & \vdots & \vdots \\ 0 & 0 & \ldots & 1 & 0 \end{bmatrix} \quad (33)$$

$$\tilde{\Gamma}^t = I_n \otimes [1 \ 0 \ \ldots \ 0 \ 0]^T$$

Remark 2: The LO purpose is to estimate the suspicious data source of each set of shadow states. After that, the suspicious indices vectors are compared logically, which eventually defines the bad data source, which will be discussed in Algorithms 1 and 2. The presence of the adversarial input $\xi$, the LO can be defined as follows, $$\hat{x}_i(h+1) = \tilde{\Lambda} \hat{x}_i(h) + \tilde{\Gamma}\tilde{U}_i(h) + \tilde{B}\xi(h) \quad (34)$$

which leads to the error dynamics can be derived from Equations (22) and (23), $$\dot{\delta}_i = \tilde{\Lambda}\delta_i + \tilde{B}\xi_i \quad (35)$$

The residual estimate that resulted from adversarial input is estimated as $$\pi_i(h) = \|\mathcal{Z}_i(h) - \mathcal{O}_i \hat{x}_i(h)\|_2^2 - TH \quad (36)$$

under an attack, $\pi_i(h)$ is non-decaying to zero (see also Theorem 2 of Chen et al., Simultaneous fault isolation and estimation of lithium-ion batteries via synthesized design of luenberger and learning observers, IEEE Trans. Control Syst. Technol., vol. 22, no. 1, pp. 290-298, January 2014; which is hereby incorporated by reference herein in its entirety).

In some embodiments, a cloud-based DT can provide an end-to-end security audit solution for the ECPS even with multiple coordinated attack scenarios. This can have two parts: a first part implemented on the cyber edge; and a second part built as a function on the cloud.

The physical, cyber, and cyber-physical twin models can be built as auxiliary functions as discussed herein. Algorithm 1 in FIG. 14 shows a DT algorithm that can be implemented on the cloud. The DT models' functions can be imported, and the connection with IoT core and shadow services can be launched. Then, the DT can be constructed based on the LO by mapping the shadow states to the LO input vector. The system can be assumed to be secure initially by setting q=0. The DT loop can start by continuously estimating the ECPS full states. If a conflict between the shadow states and the estimated state is detected or a security audit is requested by a control agent, the authentication and auditing functions can be initiated at $t_q$. This function is discussed in Algorithm 2 in FIG. 15. The purpose of the function is to return the secured observer and states, which are used to reconstruct the healthy model after the event $\Xi t_{q+1}$. The healthy desired state can be updated on the IoT shadow, which will be used later by the edge controllers.

In order to guarantee a healthy estimation of the desired control action and to discriminate between the healthy and the attacked state, Algorithm 2 can be used. The shadow states $Z_{tq}$ and the conflicted agents $\varrho\, t_q$ that were determined in Algorithm 1 can be utilized to define the malicious agents and their number $\varrho$ and $N\varrho$. Then, parallel DT observers can run by configuring the inputs with the malicious data sources $U^\sim \varrho$. For each malicious data source, the residues (Equation (36)) can be calculated, normalized, and sorted ascendingly to choose the most suspicious data source indices $\mathcal{J}$.

For each iteration, the indices $\mathcal{J}$, its Boolean representation $\Omega_\varrho$, and their estimated states $X\mathcal{J}$ can be stored. Finally, the indices of the confirmed attacked agents F can be calculated as, $$\mathcal{F} = supp\left[\bigwedge_{\varrho=1}^{N_Q} \Omega_\varrho\right] \tag{37}$$

and the equivalent secured LO can be rebuilt using the healthy states $\eta$ based on Equation (33) to be returned to Algorithm 1.

In the NMG, the leader nature is different as compared with the follower's nature. The attack on the leader can cause a complete disruption for the microgrid cluster. Therefore, in some embodiments, there can be an increased (or a maximum) security level by authenticating every incoming update from the PCC agent. However, the followers depend on their neighbors to estimate the control update and the isolation of the attacked follower can retrofit the control system back to consensus. Consequently, one algorithm for the leaders and a different one for the followers can be used to increase (or guarantee) the system security without increasing the system complexity or utilizing higher communication bandwidth.

Algorithm 3 in FIG. 16 shows the secured control for the leader $i^l$ of the microgrid (MG) cluster. First, the agent can be initialized by assuming a secure state. The leader subscribes on edge for the main leader (PCC) state. If a change in the leader state or a security event is triggered, the desired shadow state $\mathcal{X}_{i^l}^{des}$ is received from the IoT shadow. Either the received PCC state from the edge does not match the DT desired or the DT already confirmed that agent 0 is attacked. The PCC is excluded and the DT on the cloud became a tertiary controller temporary by directly utilizing the DT estimated desired $\mathcal{X}_{i^l} = \mathcal{X}_{i^l}^{des}$ If the PCC healthy, the edge update is accepted. Afterwards, the updated state is published to the edge, the cloud IoT shadow is updated, and the primary controller of this MG is actuated by this healthy control action.

Algorithm 4 in FIG. 17 can be implemented on the follower agents. After initialization and receiving the neighbor's data from the edge, the update event is checked by watching if the neighbor's states change exceeds $\epsilon$ or the security event q is triggered. Then, The Kullback-Leibler divergence $KL_i$ is used to check if the neighbors diverge from the consensus.

$$KL_i(x_j \| x_{j+1}) \sum_{j\in n_i} x_j \cdot \log\left(\frac{x_j}{x_{j+1}}\right) \tag{38}$$

where $x_j$ and $x_{j+1}$ are the neighbors of the follower i. An auditing request q will be activated if $KL_i > \aleph$. The desired estimated state by DT is received from the IoT shadow $X(\text{hat})^{des}$. A neighbor agent is marked as a malicious agent if it has the highest KL. Then, the shadow is updated by states $\mathcal{Z}_{ij}^\psi$, $\mathcal{Z}_{ij}^\Theta$ and the candidate malicious index $\mathcal{Z}_{if}^{des}$. The cloud DT feedback is received from Algorithms 1 and 2 that ensures the healthy desired state. The adjacency matrix weights are modified according to $\mathcal{F}$. Finally, using the healthy state, the consensus is updated by Equations (13) and (14) and the secured final state is published to the edge and updated on the cloud IoT shadow.

Figure 18:
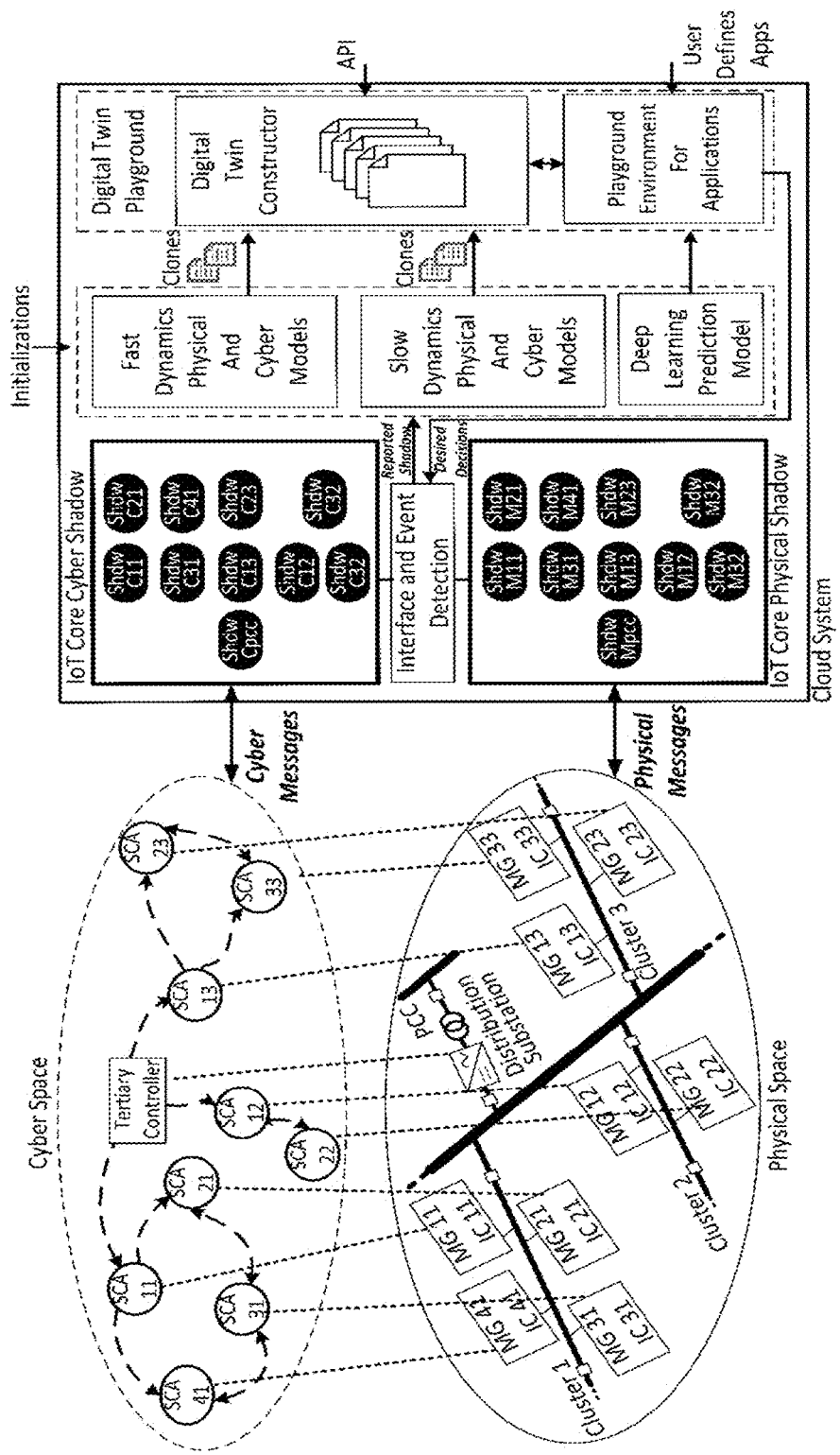
FIG. 18 shows a schematic view of an architecture that can be used with embodiments of the subject invention.
Figure 19:
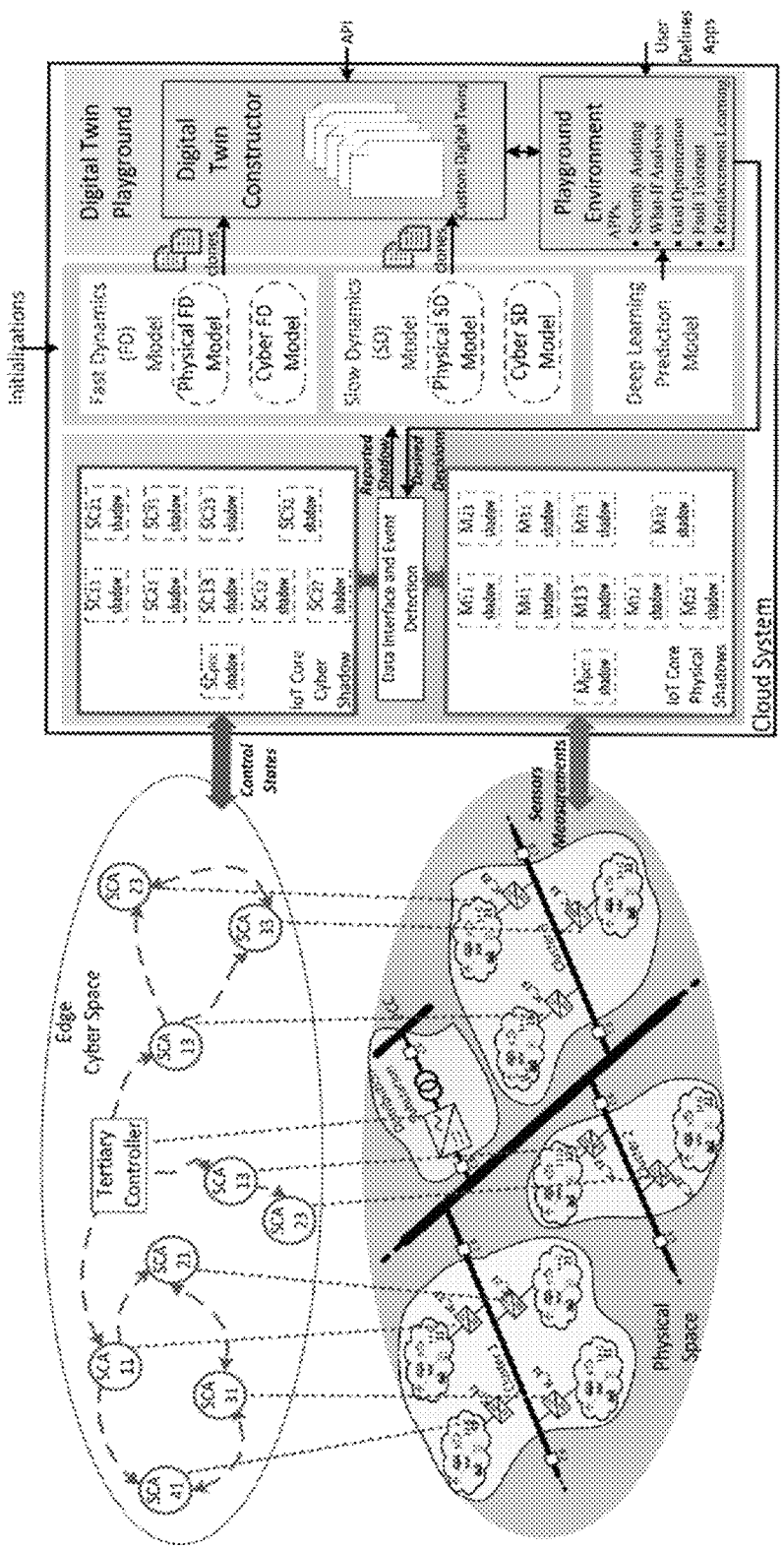
FIG. 19 shows a schematic view of an architecture that can be used with embodiments of the subject invention.

In many embodiments, a DT playground can be a real-time digital clone of the power system that holds both the last power system state and data-informed ECPS dynamic models to mimic the power system behavior. This can give the grid operator the ability to monitor, operate, secure, design, test, validate, plan, and/or study the current and future energy cyber-physical system. FIGS. 18 and 19 show schematic views of an overview of the platform. Referring to FIGS. 18 and 19, as an example of the power system, the distribution grid can be considered as the higher complex part so it is selected to show the power system DT playground. On the left-hand side, the energy cyber control system is on top of the energy physical power system. The physical system contains power electronics-based interconnected microgrids that are working as virtual power plants to perform power distribution clusters and it is coupled to the rest of the grid via an interlinking converter (IC). The cyber networked control system contains secondary and tertiary control systems that are working hierarchically to manage the microgrids, distributed generators (DGs), and/or loads interactions.

The physical distribution system can include the microgrid clusters on each feeder that includes many types of the energy units as DGs, energy storage systems (ESSs), fixed loads (LDs) and flexible loads (FLDs). The emerging power electronics devices are the main factor to regulate the power flow and maintain system stability. It is assumed that the primary controllers of the power electronic devices are a part of the physical system. The physical space can be monitored via sensors (e.g., as voltage transformers (VTs) and/or current transformers (CTs)), which can translate to digital form through micro-phasor-measurement-units (μPMUs).

In the cyberspace, the tertiary controller can interact with the utility to manage the power at the PCC. The tertiary control system can be implemented on the distribution substation and it is responsible for deciding on the transmitted power at the PCC to support many objectives as both the energy market transactions and the system ancillary services. In order to aggregate the miniature power units in the distribution grid, the secondary agents (SCAs) can work cooperatively to achieve an agreement on the tertiary control global objectives and to satisfy the local control objectives locally in the individual microgrid. The SCAs can coordinate via communication links and achieve the agreement using a consensus algorithm.

The DT platform can be implemented on a commercial or private cloud system, which provides many on demand cloud computing services such as computer processing resources, connectivity, virtual machines, IoT core, data pipelines, data storages, and/or machine learning engines. The monitored physical system can be provisioned in the cloud IoT core system via internet communication protocols. In the same way, the cyber control states can be shared from the controllers to the IoT core. These cyber and physical states can live on the cloud as a digital shadow and can include the latest information about the physical or cyber asset. Once the data is sent to the IoT core, it can be accessed by any service on the cloud. In order to manage the data access inside the cloud system for the DT purpose, a data interface function can be used. Also, an event detection function can be implemented on a service-less computing function to trigger many DT applications in real-time.

Referring to FIGS. 18 and 19, the reported shadow states can be sent to the dynamic model module. The dynamic model module is equipped with fast dynamics (FD) models and slow dynamics (SD) models for both the cyber and the physical systems. Also, a separate deep learning model can be used to perform cyber and physical behavior prediction. The module can be scalable and flexible to add more models according to future applications. These models can be built to run in real-time as a digital replica of the ECPS and can be ready for any application in the digital playground.

The DT playground can include a DT constructor engine and an applications environment to let a grid operator customize the applications and their objectives. The DT constructor can be an algorithm that is responsible for constructing a DT clone by defining the required model type, the twin input/output configuration, model merging/hybridization, and/or the full state observer design, which estimate the unknown states, solve what-if scenarios, and/or answer future unforeseen questions. The DT constructor can be programmed by a predefined application programing interface (API).

The playground environment can be introduced to create a user-friendly interface for custom applications. It can use the living DTs and predicted behaviors to give the grid operator a fearless capability of running actual real-time studies with unlimited scale but for the cloud system. After that, the decisions can be returned to the ECPS by setting the desired states on the asset's shadow.

Figure 20:
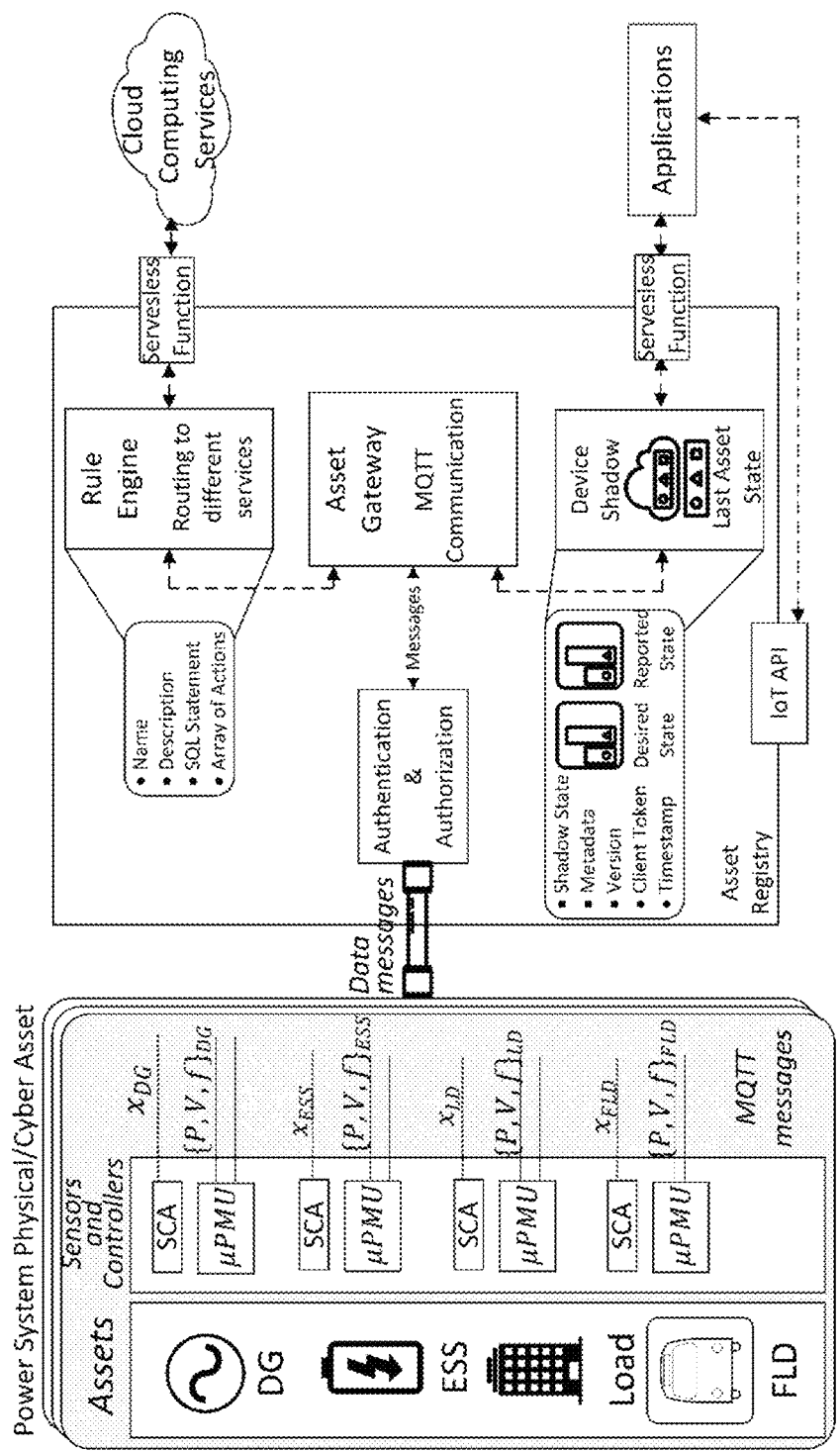
FIG. 20 shows a schematic view of a power system physical and cyber asset representation in the cloud as a device shadow using internet of things (IoT), according to an embodiment of the subject invention.

As shown in FIG. 20, each physical asset (e.g., DG, ESS, LD, or FLD) can be represented by its measurements from a sensor or gMU. The primary controller that takes the control action from the cyberspace (e.g., SCA) can be considered here as separate from the physical system because its command affects only locally. The μPMU measurements can include active power P, reactive power Q, frequency F, temperature T, and/or voltage V. The secondary control system states can include sharing percentage command, voltage restoration command, frequency stabilization command, and/or market price. The information can be sent from the physical and the cyberspaces to the cloud via MQTT, Web Socket, and/or hypertext transfer protocol secure (HTTPS). The MQTT protocol can be used due to its low latency for small messages.

On the cloud system, each asset has a registry. The messages are first authenticated, and asset policy can be verified and authorized from the information security perspective before it is accepted as to be sent to the cloud. Then, the messages can be forwarded to the IoT device shadow and according to the rule engine, the message can be passed to other cloud computing services. The device shadow can include the shadow state, asset metadata, data update version, client token, and/or the time stamp at entry. The shadow states can include two main states: the reported states; and the desired states. The shadow states are vital because they are available even when the device is disconnected. The rule engine can include the service name, the description, data filtering to specific structured query language (SQL) query, and/or the array of activities that are required as data storage, deep learning training, and/or data analytics. The service-less computing function can work to detect an event according to a predefined function and apply a rule according to that or trigger an application. The IoT API can control the access of the shadow states and send it to different DT clones for different applications. This cloud and IoT infrastructure can enable the parallel operation of different applications, and what-if scenarios analysis at the same time to get fast actions. This can great improve the power system and provide the intelligence and help grid operators need to reach an optimal and secure decision without taking many (or any) risks.

Typically, the modeling and simulation of the power system runs off-line with manual settings to, for example, study contingency analysis, plan an outage for maintenance, and/or perform future planning. The DT playground of embodiments of the subject invention can use the IoT data to give the model life and inherit a very close real-time behavior of the power system. While the cyber dynamics model and the physical dynamics model discussed below can cover many applications for the power system DT playground, the DT models are not limited thereto and other model types can be used.

With respect to the cyber dynamics model, the cyber system can be implemented using a different formulation based on the cyber system duty. In the power system industry, the networked control systems play the main role to exploit the available resources to maintain the power continuity at maximum efficiency and with a high level of resiliency. The control infrastructure of embodiments of the subject invention can be based on the distributed multi-agent controller, which agrees on a global objective along with satisfying the local objectives.

The resilient distributed control system is mainly dependent on the control agents and their communication channels. The control effort is performed cooperatively and if any agent is disturbed or the communication fails, the agreement among the SCAs cannot be reached. The purpose of the DT for the cyber is system is to continuously guarantee the reliability and the connectivity of the control agents.

Figure 21:
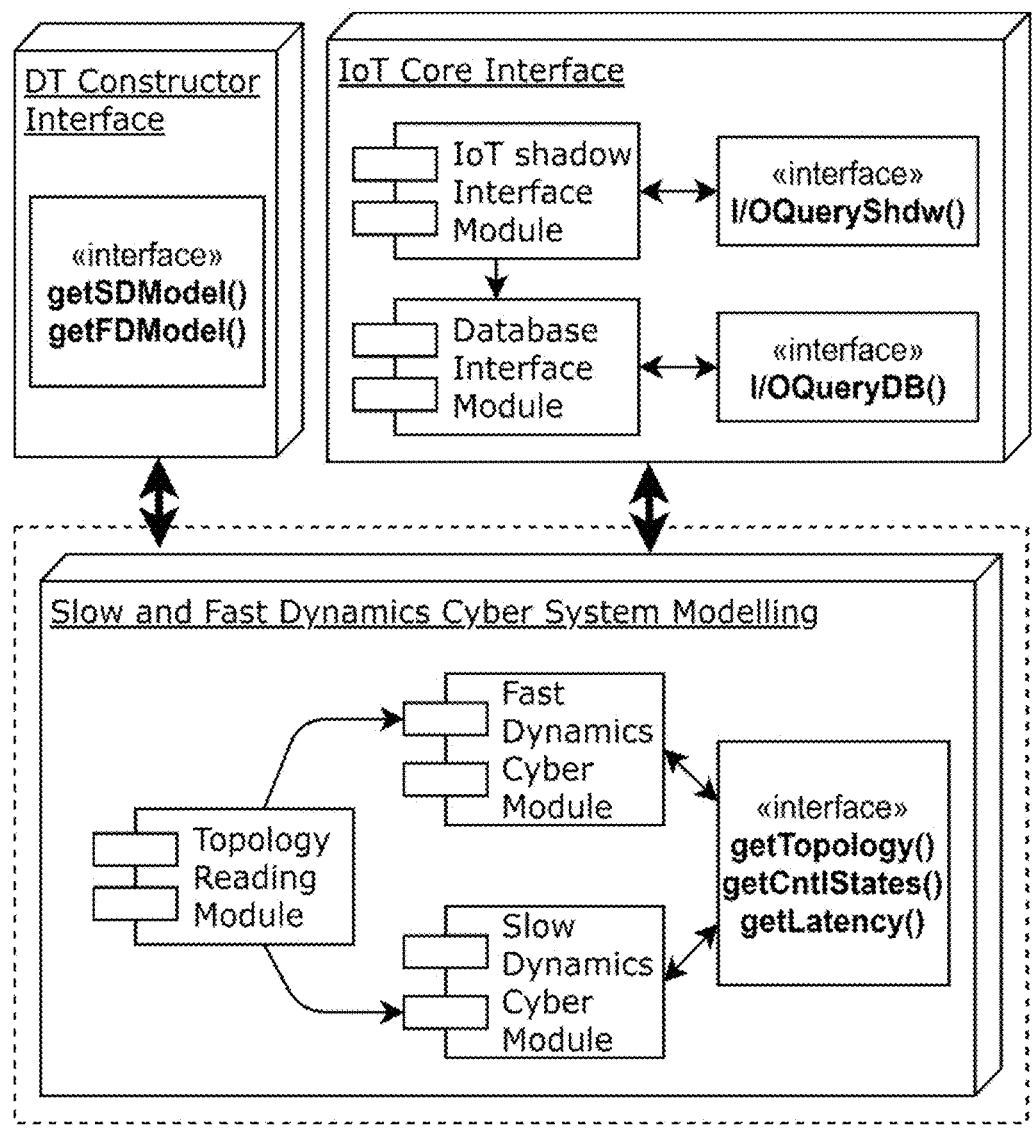
FIG. 21 shows a schematic view of cyber dynamic model modules and interfaces, according to an embodiment of the subject invention.

Referring to FIG. 21, in order to implement the digital replica of the cyber system, a topology reading module can be used. The topology reading module can use the shadow of the control agents reported states and transform it into the cyber graph topology and the features of the multi-agents connectivity as the adjacency matrix, the degree, and the Laplacian matrix. The constructed DT clones can be constructed from The IoT shadow by using a first method (e.g., I/OQueryShdw( )) and/or the stored data in the cloud-based database by using a second method (e.g., I/OQueryDB( )).

In order to model the exact control behavior of the SCAs, the graph features can be used to construct the fast and the slow dynamics of cyber models. The interface functions can be used as the topology shadow (e.g., getTopology( )), and the control states (e.g., getCntrlStates( )) and the estimated communication latency (e.g., getLatency( )) can be implemented to get the cyber system DT.

The fast and slow dynamics of the cyber graph depend mainly on the communication bandwidth among the control agents. It can be represented in the model by controlling the sampling rate of the consensus rule update. The cyber communication bandwidth sampling time $\tau_m$ is represented as a set of the fast and slow communication rate $\tau^\theta = \{\tau_{FD}^\theta, \tau_{SD}^\theta\}$. In order to merge the cyber and the physical DT models, the DT constructor can use a function (e.g., getSDModel( )) to get the slow dynamics model and a function (e.g., getFDModel( )) to get the faster dynamics model.

Figure 22:
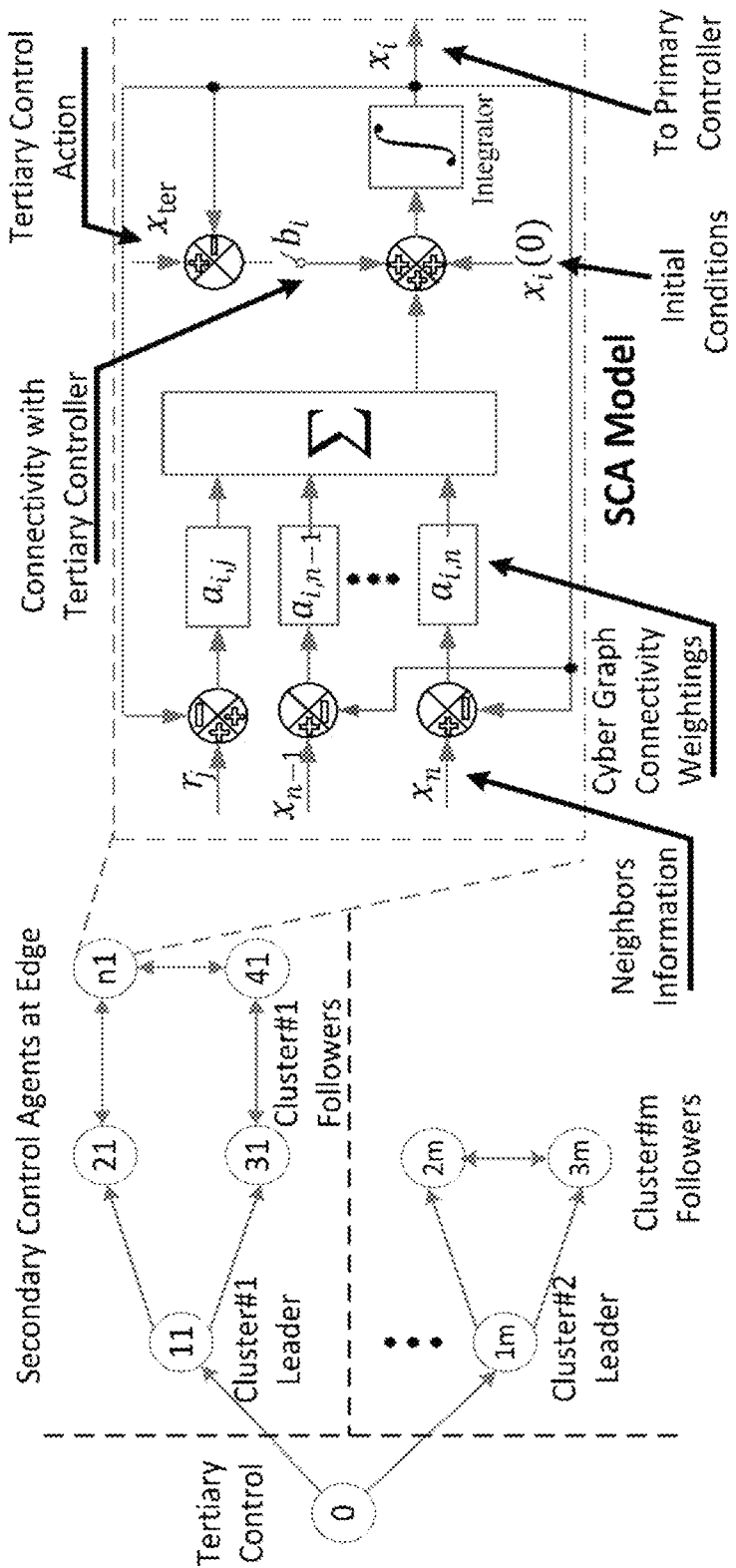
FIG. 22 shows a schematic view of a cyber control dynamic model, according to an embodiment of the subject invention.

As shown in FIG. 22, the secondary control multi-agents (SCAs) at the edge can communicate via communication infrastructure to share the global objectives. The tertiary controller (agent 0) can send the global utility objective to the leader agents of the control clusters. Then, the consensus algorithm can be used to transfer the information updates from the leaders to the entire cyber graph (follower agents). The SCA model can be used to emulate the cyber graph by implementing the model on the right-hand side of FIG. 22 for every agent and use the weighting factors $\alpha_{i,j}$ to represent the communication link connectivity and the degree of populating the control update rules to the rest of the cyber graph.

The PCC tertiary controller objective is to satisfy the energy management optimal update, which is the reference objective state $x_0^{ref}$ by coordinating among the agent's states $x_i$. The PCC agent control objective is to achieve certain reference as follows, $$\min_x(x_0^{ref}-x_0(x_i))$$

$$s.t.\ 0 \le x_0 \le 1$$

$$0 \le P_0 \le x_{0,max}$$

The SCAs cooperate to achieve a consensus on the tertiary control objective. According to the graph theory, the cyber communication is a graph $\mathcal{G}=(\mathcal{V},\varepsilon)$ that determines the cyber state coupling of the agents' dynamics where $\mathcal{V}=\{0, 1, \ldots, n\}$ is the vertex set with a set of edges $\varepsilon \subseteq \mathcal{V} \times \mathcal{V}$ is the coupling between the control agents. The edge $(i,j) \in \varepsilon$ represents the cyber state of $i^{th}$ agent, which will influence the dynamics of $j^{th}$ agent according to weighing factor $\alpha_{ij}$, which is represented as a global adjacency matrix $\mathcal{A}$, which is represented as follows, $$[\mathcal{A}]_{ij} = \begin{cases} a_{ij} > 0 & \text{if } i, j \in \varepsilon \\ 0 & \text{otherwise} \end{cases} \qquad (40)$$

The graph Laplacian matrix is defined as $\mathcal{L}=\mathcal{D}-\mathcal{A}$, where $\mathcal{D}=\text{diag}\{d_i\}$ is the in-neighbors degree matrix and $d_i=\Sigma_{j \in n_i} \alpha_{ij}$. The dynamics of the consensus protocol can be modeled as a set of interacting agents that achieve a common goal $x_0$. The system model is formulated as follows, $$\dot{x}_i = \sum_{j \in n_i} a_{ij}(x_j - x_i) + b_i \cdot (x_0 - x_i) \qquad (41)$$

$$\dot{X} = -(\mathcal{L}+b) \cdot X + b\underline{1}x_0 \qquad (42)$$

where $b_i$ is the pinning gain, which characterizes the spanning tree at the leader and b is the main diagonal matrix that contains $b_i$.

In order to provide the cyber model the flexible compatibility with the physical model, the cyber system dynamics can be in the linear time-invariant state-space representation. A cyber thing $\theta \in \Theta$ represents a controller state $x^\theta \in X^\theta$, which uses the sensor measurement and the cyber graph $\mathcal{G}$ to control the physical asset $\varphi$. The cyber system dynamics is given by:

$$\left.\begin{array}{l} \dot{X}^\Theta = A^\Theta X^\Theta + B^\Theta U^\Theta \\ Y^\Theta = C^\Theta X^\Theta \end{array}\right\} \qquad (43)$$

where the cyber states $X^\Theta=X^{ref}$, the graph control input $U^\Theta=X_0$, the cyber system dynamics are $A^\Theta=(\mathcal{L}+b)$, $B^\Theta=\text{tb}\underline{1}$, $C^\Theta=I_n$ and were $\iota$ is a constant gain, which is chosen to ensure the synchronization among agents.

Figure 23:
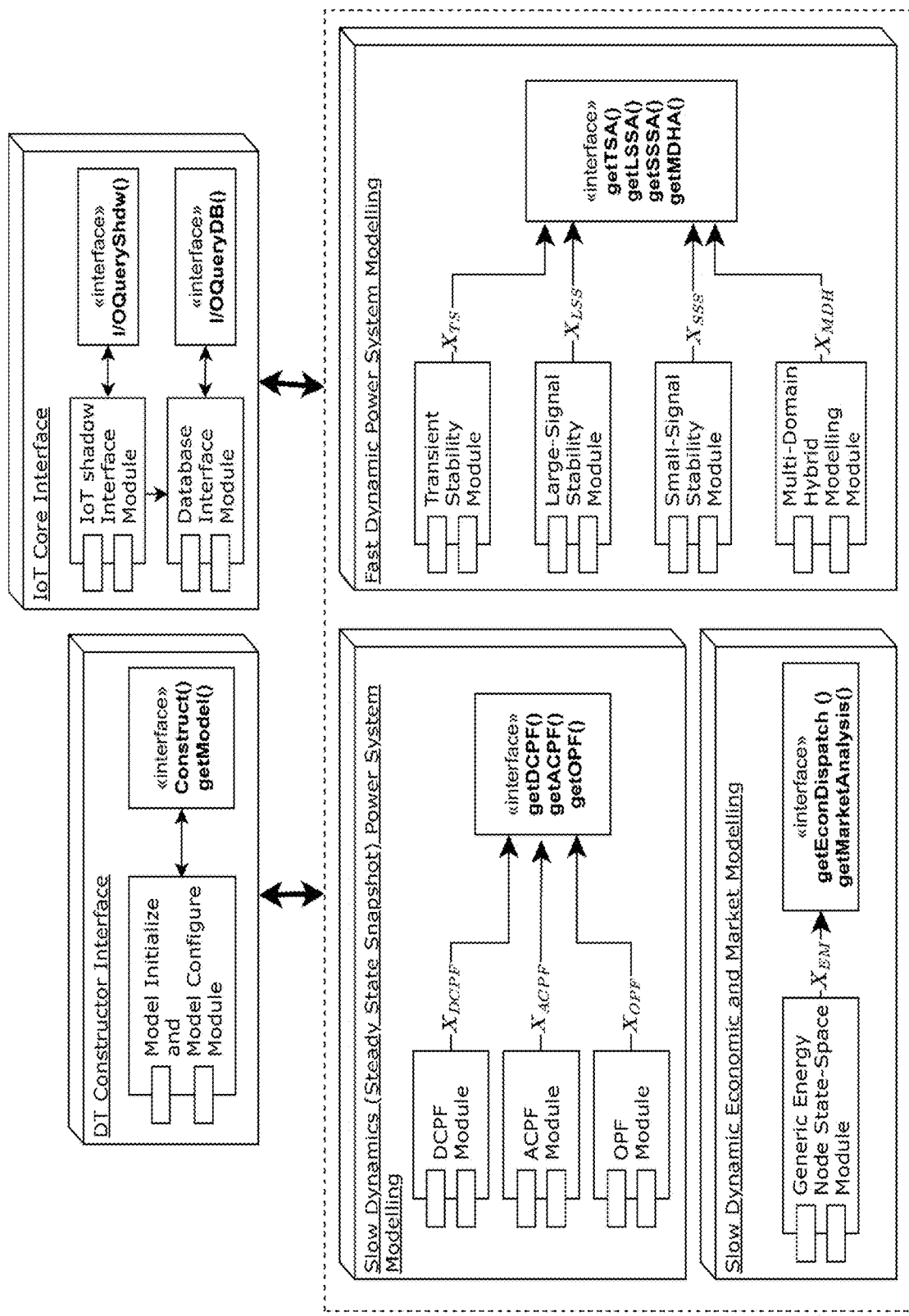
FIG. 23 shows a schematic view of physical dynamic model modules and interfaces, according to an embodiment of the subject invention.

With respect to the physical dynamics model, the digital twin nature is based on the life model and the model specifications is an objective-oriented model. According to the application of the DT, the modeling methodology, response, and accuracy are defined. In the DT playground for the power system and energy applications, the power system model can be classified into three different modeling types. FIG. 23 shows the physical modeling modules and their interfaces for DT implementation.

Referring to FIG. 23, the first type is the steady-state power system modeling, which can provide real-time snapshot-based studies as load flow analysis, line loading violation, voltage profile deviation, and/or contingency assessment analysis. The steady-state modeling is considered as a snapshot-based slow dynamics. Based on the accuracy requirements of the DT application, the steady-state modeling module can be selected from among three types: DC power flow analysis (DCPF); AC power flow analysis (ACPF); and optimal power flow analysis (OPF). These modules can be interfaced with the other modeling modules according to the application objectives. The interface with this module can be executed by three methods (e.g., getDCPF( ), getACPF( ), getOPF( )).

The second type of slow modeling module is for the economic and market real-time analysis. The modeling methodology can be based on a generic energy node state-space formulation for each energy source, energy storage system, load, and grid connectivity. This model can be designed to be independent to simplify the economic dispatch study, market operation, and/or optimal power commitment. The capabilities of the second module can be extended for certain applications that care about the security-constrained market operation by interfacing the generic energy node module with the steady-state modules. Based on a selected case study, the module interface class methods can be referred to as getEconDispatch( ), getMarketAnalysis( ).

In the third type, the fast dynamics power system modeling techniques can include four modules as shown in the right-hand side of FIG. 23. The transient stability module is responsible for transient stability assessment, fault critical clearing time, and dynamic voltage stability. The large-signal and small-signal stability modules are provided for the large and small disturbance effect on the stability, respectively. The fourth module is responsible for modeling multi-domain models as electro-mechanical interaction and/or power-electronics converter interaction with the grid. This type has four methods: performing transient stability analysis (e.g., getTSA( ); analyzing the effect of large or small disturbances (e.g., getLSSA( ), getSSSA( ); and getting the result of multi-domain simulation (e.g., getMDHA( )).

These different modules can be merged by using the DT constructor interface methods (e.g., Construct( ) and getModel( )), which includes the module that is responsible for the modeling initialization and configuration. According to the application, the model modules are selected and merged and initialized based on the last shadow states that are coming from the IoT core interface modules. The input/output (I/O) interface between the modules and the IoT core for both the shadow and the databases can be performed by the query filtering instructions (e.g., I/OQueryShdw( ), I/OQueryDB ( )).

In the conventional power systems, the energy is generated then distributed after transmitting it from the bulky generators to the load centres. This traditional form of the power system is changing recently and will continue to change in the future to be in distributed form with multiple power flow direction. The main cell of the newly constructed power systems is the NMGs.

Figure 24:
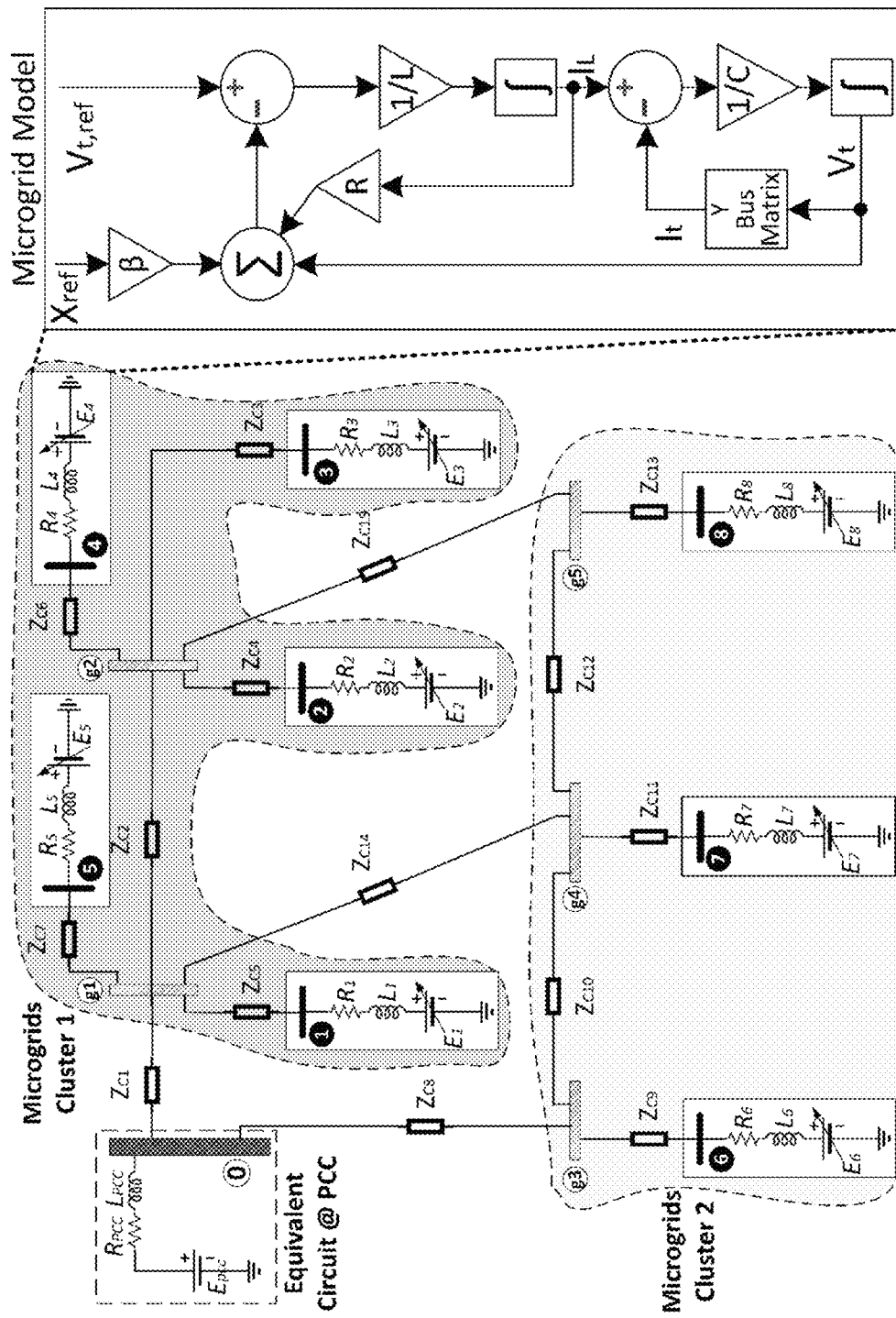
FIG. 24 shows a schematic view of a fast physical dynamics model of NMGs in a power distribution system, according to an embodiment of the subject invention.

The physical DT model of the interconnected microgrids can be represented as in FIG. 24. In order to model the fast dynamics model of the NMGs, the objectives of the DT application should be defined first. For instance, the objective of modeling networked DC microgrids might be the power transaction and the power balancing rule among the microgrids and the PCC. Therefore, the implemented physical DT model mainly emphasizes the bidirectional power electronics converters because they are the things that control the power flow transaction and regulates the system parameters.

In order to represent the DT physical model, each microgrid can be represented as the Thevenin equivalent source that is shown in the bottom of FIG. 24. Mathematically, the microgrid i can be represented as follows, $$L_i \frac{dI_i}{dt} = E_i^* - r_i I_i - v_i^t \Biggr\} \quad (44)$$
$$C_i \frac{dv_i^t}{dt} = I_i - I_i^t$$

where $\tilde{I}_i$ ($I_i$(bar)) is the $i^{th}$ microgrid converter average inductor current, $E_i^*$ is the reference voltage at the $i^{th}$ microgrid $v_i^t$ is the microgrid terminal voltage and $I_i^t$ is the transmitted current from/to microgrid i to the grid. The parameters $R_i$, $L_i$ and $C_i$ are the equivalent resistance, inductance, and capacitance, respectively of each microgrid. It is assumed that the microgrid output is controlled by the reference signals of the terminal voltage $V_i^{t,ref}$ and the output reference power $P_i^{ref}$ using the droop control characteristics as follows, $$E_i^* = V_i^{t,ref} - \beta_i(x_i^{ref} - x_i) \quad (45)$$

where $\beta_i$ is droop coefficient and the output power can be characterized in terms of power-sharing factors. The microgrid terminal $t_i$ is connected to the distribution grid nodes $g_j$ which has voltages $v_o^g$ and the transmitted current to the grid nodes and $y_{ij}^{tg}$ is the line or cable admittance between the nodes $t_i$ and $g_j$ can be defined as, $$I_i^t = \sum_{j \subset m} I_j^g = \sum_{j \subset m} y_{ij}^{tg}(v_i^t - v_j^g) \quad (46)$$

Because the balancing and power flow is the purpose of the model, the electromagnetic transients are ignored, which leads that the grid interconnection model is represented as follows $$L\frac{dI}{dt} = V^{t,ref} - \beta X^{ref} - RI - V^t \Biggr\} \quad (47)$$
$$C\frac{dV^t}{dt} = I - I^t$$
$$I^t = Y^{tt}V^t + Y^{tg}V^g$$
$$I^g = Y^{gt}V^t + Y^{gg}V^g$$

Generally, the physical asset $\varphi \in \Phi$ is represented by the physical set of states $X^\Psi$, which is measured by a sensor $\psi \in \Psi$. The physical system with control input $U^\Psi$ is represented in state-space form as, $$\dot{X}^\Psi = A^\Phi X^\Psi + B^\Phi U^\Psi \Biggr\} \quad (48)$$
$$Y^\Psi = C^\Phi X^\Psi$$

Figure 25:
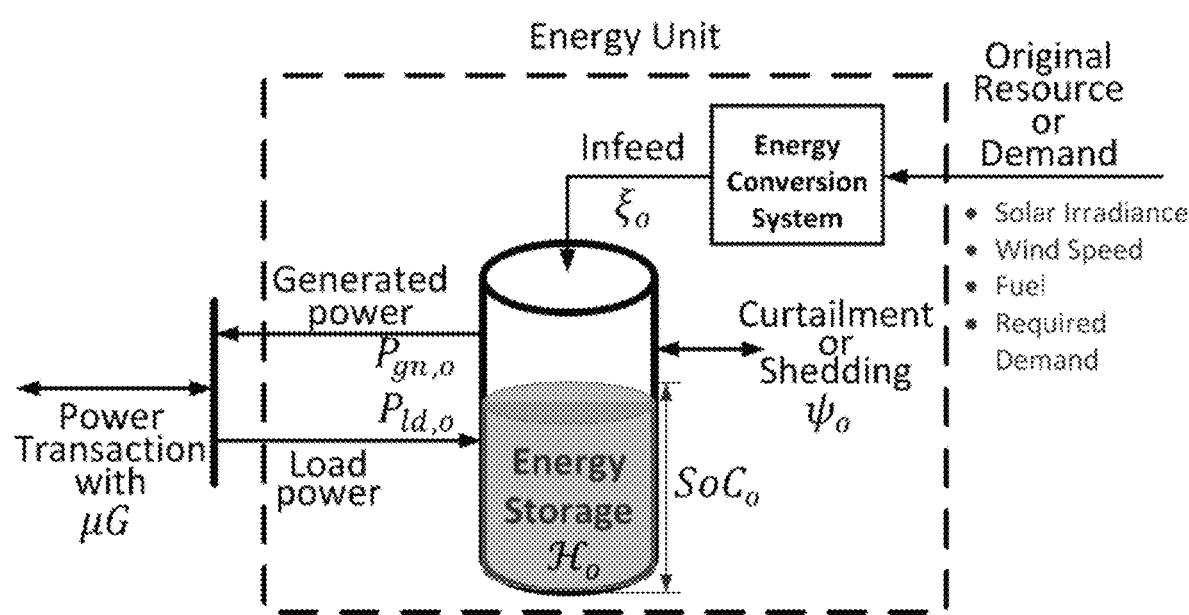
FIG. 25 shows a schematic view of a slow dynamics generic energy node model of NMGs.

On the other hand, the slow dynamics physical system model of the NMG can be represented in state-space energy nodes formulation. Let a distribution grid has $o^{th}$ interconnected energy units. These energy units can be distributed generation (as solar, wind, or conventional generator), ESS (as battery storage system or thermal storage system), fixed loads, or flexible loads (as an electric vehicle parking garage or nanogrids). FIG. 25 shows the slow dynamics physical model of an energy unit. Generally, the energy unit can be represented as a generic energy node with original infeed source from the energy resource as the solar irradiance or the required demand. If the infeed energy is storable with capacity IC, the node can represent ESS or flexible load. If the energy cannot be stored, the node represents a generation or the fixed load and $\mathcal{H} = 0$. In the case of representing the renewable resource as solar or wind and excessive power is present, the power curtailment can be represented by $\psi < 0$. In the case of representing the loading, represents the load shedding and $\psi > 0$. When the generic node has $P_{ld} = 0$, it represents a generation mode. Also, if the generated power $P_{gn} = 0$, the unit represents the load. If both generation mode and loading mode exists, the node represents ESS. The generic mathematical formulation of the $o^{th}$ energy unit representations is, $$\mathcal{H}_o \dot{SoC}_o = -\eta_{gn,o}^{-1} P_{gn,o} + \eta_{ld,o} P_{ld,o} \pm \xi_o +$$
$$\psi_o - \varrho_o (SoC_o - SoC_o^{(0)}) \quad (49)$$

where $SoC_o$ and $SoC_o^{(0)}$ are the state of charge and the initial state of charge of $o^{th}$ energy unit. Also, $\eta T_{ld}$ and, $\eta_{gn}$ are the efficiency of the generation and loading operation, and $\varrho_o$ is a variable that represents the flexible load controllability.

The DT playground can include three components that work to produce the DT clones for different parallel applications. The DT constructor engine selects the model's types that are required for a certain DT application. Then, the models are merged and configured to be one hybrid model. Last, the hybrid model is added into the Luenberger Observer (LO) set up to estimate the system full state.

Figure 26:
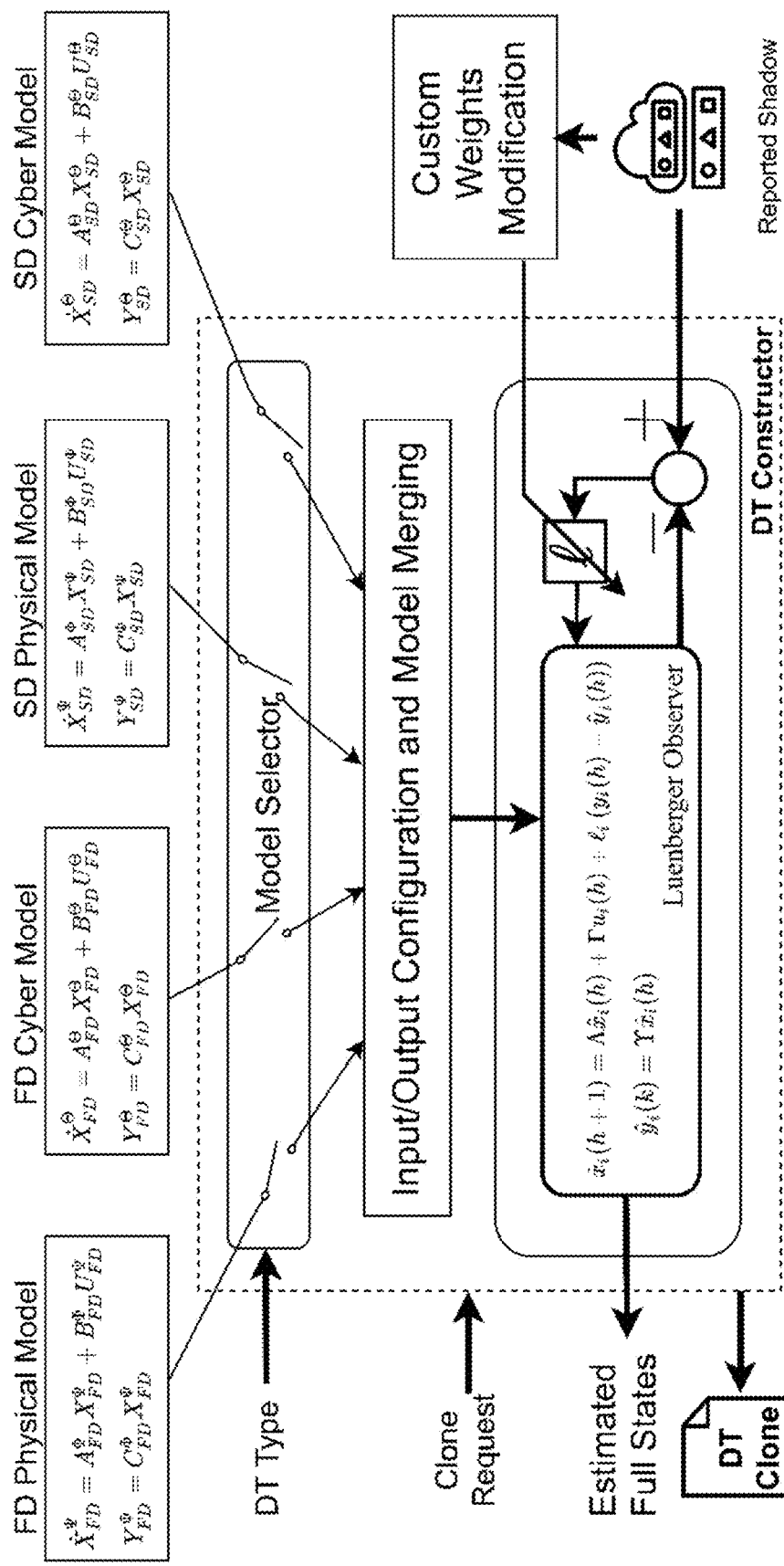
FIG. 26 shows a schematic view of a DT constructor architecture that can be used with embodiments of the subject invention.

As shown in FIG. 26, when a DT clone is requested for certain application or study, the types of models are selected according to the application specifications from the previously discussed models as fast dynamics physical model, fast dynamics cyber model, slow dynamics physical model, and slow dynamics cyber model. At that time, the healthy reported shadow states will define the known and the unknown states alongside with the required estimated states to define the state-space inputs and outputs. After that, a series of state-space representation is used to merge the models into one hybrid model. The CPS hybrid models are combined into a single concatenation dynamical model from both systems (Equations (43) and (48)) to represent the overall system behavior. The hybrid system model that has hybrid outputs $Y^{\Theta\Psi}$ is represented as, $$\begin{bmatrix} \dot{X}^\Theta \\ \dot{X}^\Psi \end{bmatrix} = \begin{bmatrix} A^\Theta & 0 \\ B^\Phi C^\Theta & A^\Phi \end{bmatrix} \begin{bmatrix} X^\Theta \\ X^\Psi \end{bmatrix} + \begin{bmatrix} B^\Theta \\ 0 \end{bmatrix} [U^\Theta] \quad (50)$$

-continued $$[Y^{\Theta\Psi}] = [0 \quad C^{\Phi}]\begin{bmatrix} X^{\Theta} \\ X^{\Psi} \end{bmatrix} \quad (51)$$

The Luenberger observer setup is used to put the constructed model into real-time interaction with the real physical/cyber system to estimate the full internal state by removing the noise and ride through the disturbance. Because the Luenberger observer delivers zero dynamics error if and only if the gain is chosen in the strictly stable region, the Luenberger weights are modified based on the predictions from a pre-trained deep-learning model, which has the access of the last shadow states. The LO is constructed firstly for the full healthy state as, $$\hat{\mathcal{X}}_i(h+1) = \Lambda_i \hat{\mathcal{X}}_i(h) + \Gamma \mathcal{U}_i(h) + \ell_i(\mathcal{Y}_i(h) - \hat{\mathcal{Y}}_i(h)) \quad (52)$$
$$\hat{\mathcal{Y}}_i(k) = \Upsilon \hat{\mathcal{X}}_i(h)$$

where $\hat{x}_{i,i}$ and $\mathcal{Y}_{i,i}(k)$ are the estimated states and outputs that is calculated according to the control input $\mathcal{U}_i$ and the shadow states $\mathcal{Y}_{i,i}$. $\Lambda$, $\Gamma$ and $\Upsilon$ are hybrid merged model parameters. The LO weights $l_i$ is selected such that the eigenvalues of $(\Lambda-l\Upsilon)$ is stabilizable.

Figure 27:
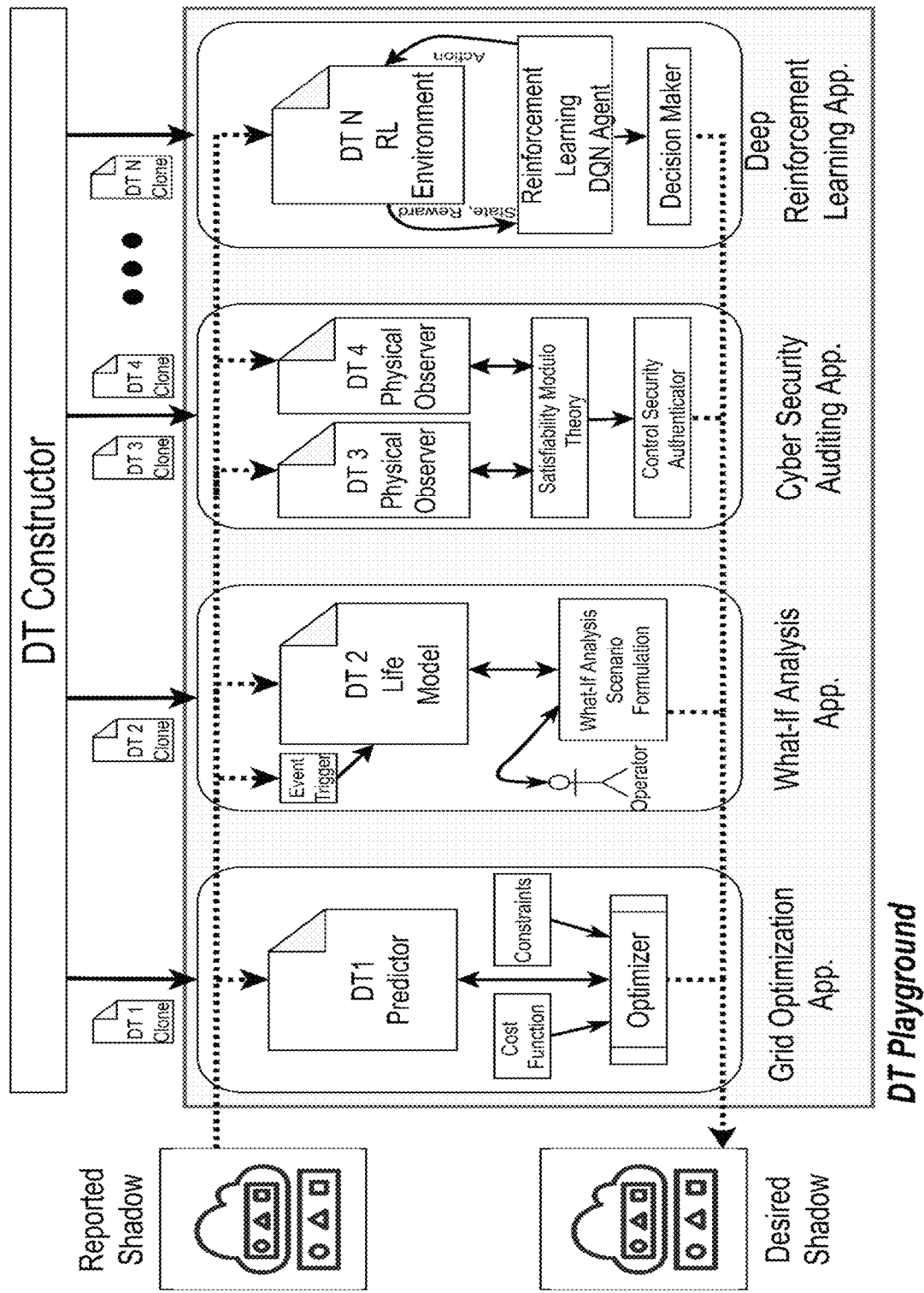
FIG. 27 shows a schematic view of a DT playground and applications environment, according to an embodiment of the subject invention.

The DT constructor engine can be designed to feed multiple applications with the DT clones according to the application requirements. The DT playground is the container that is used to launch the DT applications. In FIG. 27, the DT constructor distributes the DT clones over the applications (apps). The real-time reported shadow states are fed into each application's DT according to the type of the DT. The resulting computations and decision that are taken is updated also under the desired shadow sate field in the IoT core to reflect the DT decision into the edge controllers.

Many parallel applications can be launched in the cloud as ECPS environment for real-time reinforcement learning, grid optimization, power system security auditing, what-if analysis, microgrid fault-tolerant, and/or situational awareness. FIG. 27 shows how some of these applications can be implemented in the DT playground. The grid optimization application utilizes the first clone (DT 1) as a predictor to optimize the grid operation by minimizing the fuel cost and losses while maximizing the benefits and renewable energy usage. Also, the DT predictor helps to cope with the variability and uncertainty of the large-scale PV and Wind energy penetration without violating the power system constraints. The DT 1 uses the shadow states updates to dynamically dispatch and aggregate the power from wide-area power system primary and secondary distribution to give the distributed controllers of the networked microgrid the life centric oversight, which effectively operate the grid.

The second DT (DT 2) represents the life model to answer the operator what-if question for various kinds of study as the on-line N−1 contingencies, N-k contingencies and the power system state estimation. Also, the what-if scenario app can be autonomously configured using the operator APIs to define the recommended steps and decisions if an event is detected. For instance, if a large generator or a vital power transmission line is tripped, the real-time update of the DT 2 will use the last system topology and propose decisions such as rerouting the power to decongest the overloaded lines, load shedding to restore the stability, and/or activating ESSs to restore the system to its normal state. The existence of the on-line DT with last system state will accelerate the restoration process, inhibit (or prevent) the cascaded outage, and/or minimize the blackout region.

The cybersecurity of the distributed control graph is critical for the secondary and tertiary control systems. In this application, two DTs (DT 3, DT 4) can be utilized to check the consistency of the distributed control actions with the physical system real-time states. DT 3 is designed as a physical system observer to estimate the physical system full state, and DT 4 provides the cyber system dynamics. For instance, if the distributed SCA is working to make consensus on certain power-sharing and one of the control agents is attacked, the Satisfiability Modulo Theory can be to authenticate the cyber control action by comparing the cyber states (DT 4 estimates) and the last physical measurements (DT 3 estimates) to detect the attacked control agent and isolate from the control process. The benefits of that the cloud centricity can discover even the multiple coordinated attacks on the cyber system.

Because the power system is a highly non-linear complex system, the regular decision making, control, and management techniques cannot guarantee the safe operation of the grid especially during the risks of catastrophic situations. The deep reinforcement learning (RL) techniques can get the best possible actions to take for unexpected cases in a fast and autonomous way without human intervention. The RL requires an environment to learn and after many iterations of taking actions, observing the states, and collecting the rewards, the controller can provide out of the box solutions. Adding the life DT as a safe environment, in which the RL agent can manipulate and get real feedback from the system, can boost the abilities not only during the learning process but also with the real-time interaction with the grid. Also, the actions taken by the agent can be safe because it is a digital clone. In this Application, deep Q network (DQN) can be utilized as an RL agent to deal with the DT N environment.

Embodiments of the subject invention address the technical problem of making power systems (particularly energy cyber-physical systems) more resilient (e.g., to attacks) by providing an IoT-based DT for cyber-physical NMGs to be a centric oversight for the NMG system.

The transitional term "comprising," "comprises," or "comprise" is inclusive or open-ended and does not exclude additional, unrecited elements or method steps. By contrast, the transitional phrase "consisting of" excludes any element, step, or ingredient not specified in the claim. The phrases "consisting" or "consists essentially of" indicate that the claim encompasses embodiments containing the specified materials or steps and those that do not materially affect the basic and novel characteristic(s) of the claim. Use of the term "comprising" contemplates other embodiments that "consist" or "consisting essentially of" the recited component(s).

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of embodiments of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

Figure 5:
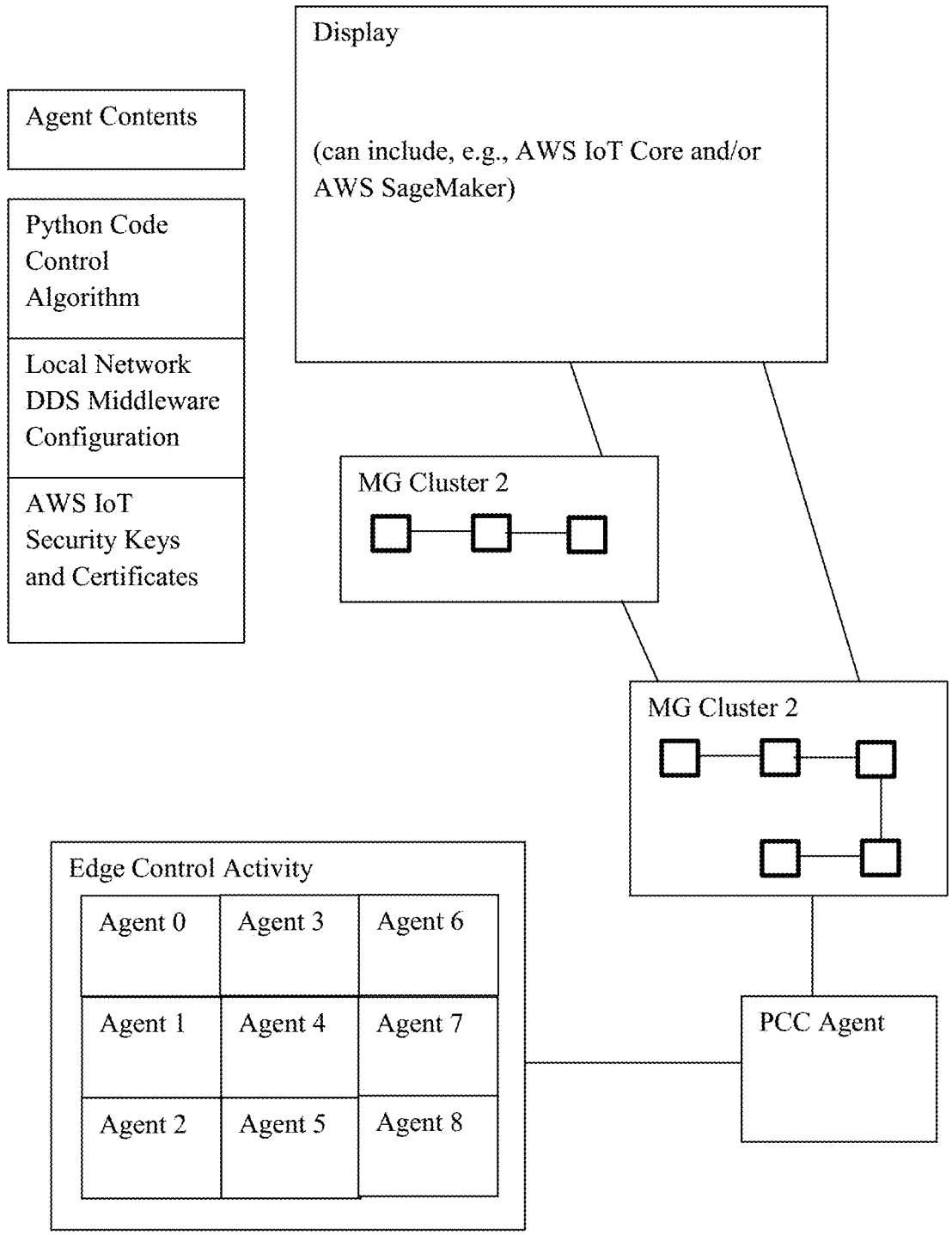
FIG. 5 shows a block diagram of practical distributed control and digital twin (DT) implementation, according to an embodiment of the subject invention. Although FIG. 5 references Amazon Web Services (AWS), this is for exemplary purposes only; embodiments of the subject invention can utilize other software and/or databases.

A system according to an embodiment of the subject invention was implemented practically by developing two main platforms. Locally, the distributed controllers were implemented on embedded single board computers. Remotely, cloud computing was implemented on a cloud server (e.g., a cloud vendor such as Amazon Web Services (AWS) can be used, though embodiments are not limited thereto). FIG. 5 shows a block diagram of the practical implementation.

The distributed controllers used onboard wireless (e.g., WiFi) modules to communicate locally with each other via a protocol (e.g., via user datagram protocol (UDP)) and to communicate with the upper cloud layer via a protocol (e.g., via transmission control protocol/internet protocol (TCP/IP)). The networked control algorithms and the communication interface settings were applied on embedded toolkits (e.g., Raspberry-Pi3B+ toolkits) as control agents (e.g., using Python Programming).

A data distribution service (DDS) middleware interface was used to share the control parameters locally within the control edge (see also Zhang et al., Consensus of heterogeneous linear multiagent systems subject to aperiodic sampled-data and DoS attack, IEEE Trans. Cybern., vol. 49, no. 4, pp. 1501-1511, April 2019; which is hereby incorporated by reference herein in its entirety). The DDS is machine-to-machine connectivity that can be implemented locally without a message broker. For example, a connector package (e.g., rticonnextdds-connector Python package; see also RTIcommunity, Rticonnextdds-Connector, [Online], Available: https://github.com/rticommunity/rticonnextdds-connector-py, 2019; which is hereby incorporated by reference herein in its entirety) was used to configure the publish/subscribe connectivity on each embedded controller. Both the connectivity and the communication quality of service (QoS) were configured using an extensible markup language (XML) configuration file. This configuration increases the likelihood of (or guarantees) lower latency, packet-loss mitigation, and IT security batches.

In order to communicate with the cloud, a message queuing telemetry transport (MQTT) client was created using AWSIoTPython SDK to exchange messages. On AWS, HTTPS, Web Sockets and MQTT protocols are available to interact with the cloud. The MQTT was selected due to its low latency for small messages. On each device, the generated keys and certificates were attached and configured to define the device on the AWS cloud computing platform. Those authentication files were generated during the creation of each thing on the AWS IoT Core. Each device had a detailed model for its microgrid to emulate the real physical system. An event-based callback function was implemented to trigger the data interaction based on the events. The cloud communication had higher latency compared to edge communication. Performance analysis of the local DDS communication and the remote MQTT communication was analyzed. The sampling rate of the edge control system and the shadow sampling rate were assumed to be k=0.2 seconds (s) and h=2 s, respectively. The thresholds were set as $\delta=0.01$, $\aleph=0.035$, and TH=0.05.

Figure 6:
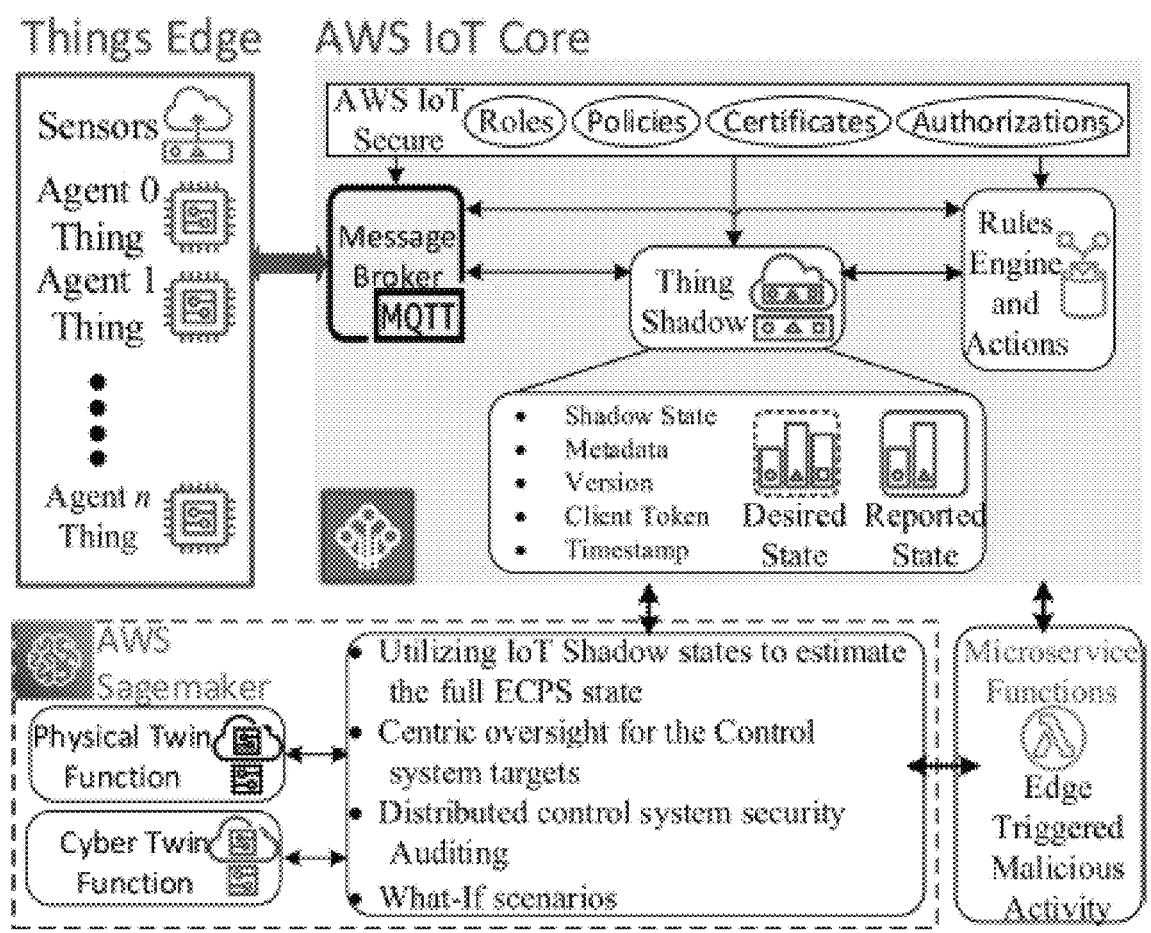
FIG. 6 shows a schematic view of a DT description. Although FIG. 5 references AWS, this is for exemplary purposes only; embodiments of the subject invention can utilize other software and/or databases.

Numerous components involved in the ECPS require a flexible, reliable, and integrated system that can deal with the IoT complexities. The cloud computing services cover these needs by including computing servers, databases, networking, analytics, and intelligence over the Internet. FIG. 6 shows the functional block diagram of the implemented services.

The IoT Core is a cloud service that enables things to connect securely and interact with different cloud services and applications. Each thing is registered on the cloud. The IoT policy is created to control the access and allows/denies a predefined service to be accessed by the thing. Then, the created policies are attached to each thing's certificate. On the edge of the things, each sensor/controller is configured by attributing the generated keys and certificates to its device. One of the default settings in the thing policy is the access of the MQTT message broker to the thing. The MQTT communication protocol was used to interact (get and update) with the shadow of the things on the AWS cloud. The thing shadow was a JavaScript object notation (JSON) payload that is used to store and retrieve the things' last states. The contents of the shadow file are shadow states, asset metadata, update version, client token, and the timestamp of the last transaction. The shadow has two categories: the reported states ($Z_i$); and the desired states ($Z_i^{des}$). The metadata holds a tuple of the constant parameter of each microgrid as the power and voltage ratings, the location, the owner, and the updated version. Also, one of the main IoT core components is the rule engine, which includes the filters and which takes actions on the fly based on predefined rules. The actions can be activated by a cloud microservice function (the AWS Lambda function was used).

The AWS lambda-Function is a service-less computing function that can trigger a computing service in response to a detected event or a predefined logic/task. The security audit event q was managed by the lambda-function. Besides, it can update the tertiary control and management objective, launch a response to grid ancillary service during a contingency, and/or guide the secondary control layer or response to restoration request after a blackout.

The AWS SageMaker is an integrated and managed computing service. The physical twin, the cyber twin, and the hybrid ECPS models were implemented as functions to be imported by different tasks and applications. In addition to the centric oversight and security auditing applications, the Sagemaker was used to guide the distributed controllers and run what-if scenarios using LO based DT.

The FDIAs were artificially soft coded and implemented on each controller to emulate the attacker. The attacked agent, attack vector, and the attack time instant were predefined according to the required emulation. For the attacks on the edge controllers, the artificial attack agent can join the network, subscribe on data, and publish under the topic name of the infected real agent. Also, it was designed to be able to publish/subscribe on/to the cloud messages. The attacker agents can be configured to launch an attack on the link between the infected agent and its neighbor(s). Also, the attacker agent was configured to mislead the cloud by reporting a healthy state to it while publishing faulty data to the edge. By the same emulator, the multi-coordinated attacks can be launched on multiple agents to degrade the consensus. This can be done by activating the soft-coded attacks on multiple agents simultaneously. The denial of service (DoS) attacks, network delay, and the packet loss emulation were implemented using network emulation software. The Linux Network Emulator (NETEM) tool was utilized. The network corruption, the switched delay, and the packet loss probability functions were used to implement the DoS, the delay, and the packet loss, respectively.

Figures 7A, 7B, 7C:
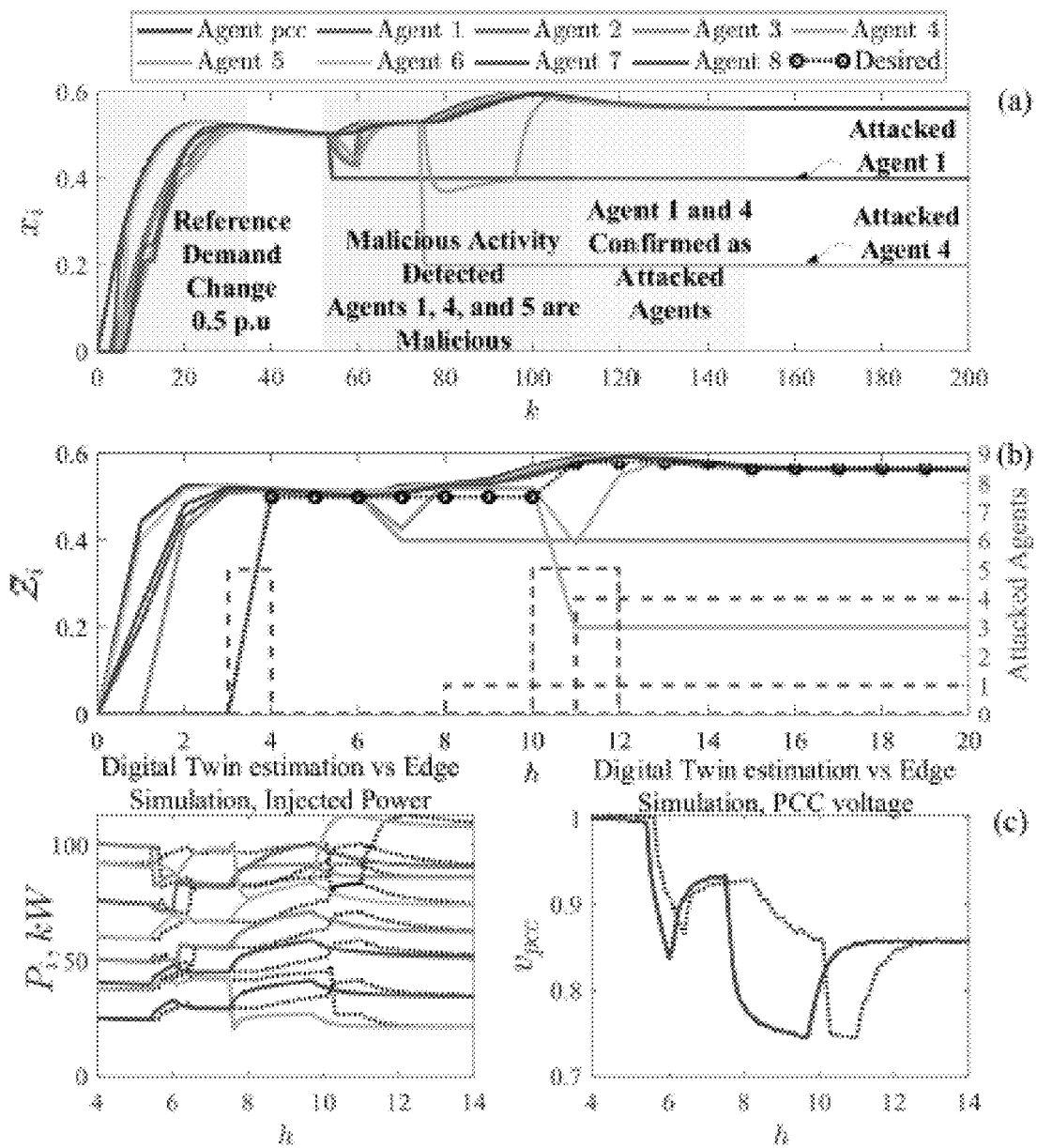
FIG. 7($a$) shows a plot of $x_i$ versus k, showing response under multiple attacks on multiple agents (in this case, agents 1 and 4) with mitigation.
Figures 8A, 8B, 8C:
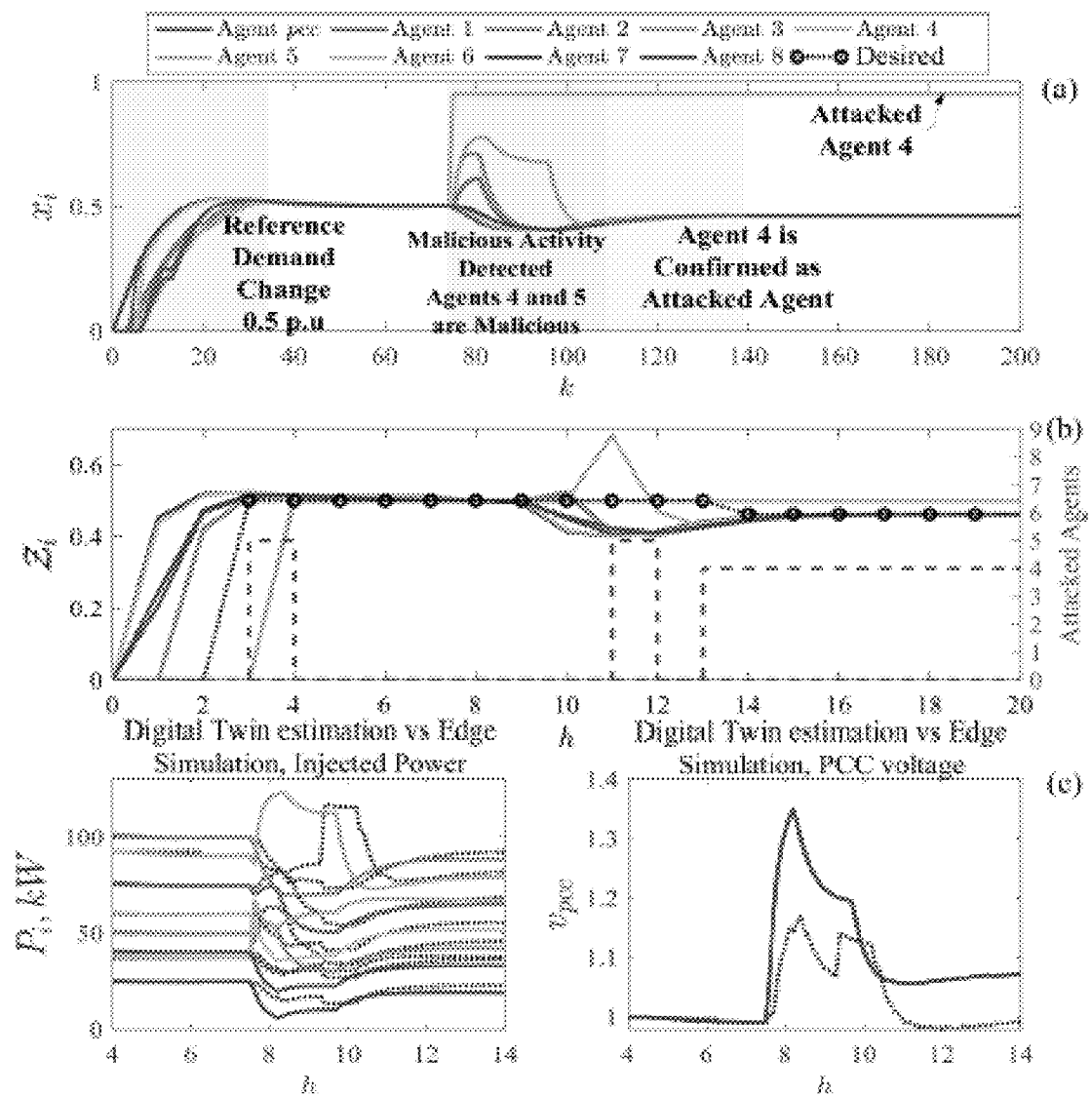
FIG. 8($a$) shows a plot of $x_i$ versus k, showing response under attack on an agent (in this case, agent 4) and cloud misleading with mitigation.

FIGS. 7(a)-7(c) show the first scenario of multiple coordinated attacks on the first cluster's leader (agent 1) and agent 4, at k=55 and k=75, respectively. FIG. 7(a) shows the states on the edge cyber system. The edge system detected a malicious activity and the suspected agents were 1, 4, and 5. The left-hand y-axis in FIG. 7(b) shows the reported IoT shadow states and the desired state. On the right-hand y-axis of FIG. 7(b), the attacked agents are depicted. Agent 5 has been temporarily declared as attacked during h=3 to 4 because of the delay produced by the algorithms' initialization. In addition, the divergence of Agent 5 away from the desired state at h=10 to 12 is resulted by the attack on agent 4. The DT based authentication was able to find the new healthy desired state and confirm that Agents 1 and 4 were attacked. Therefore, even though Agent 5 was subjected to the delay and misleading, the agent succeeded to use the estimated healthy PCC desired state to retrofit its consensus dynamics by comparing both neighbors with the DT desired state and mitigated the attack by excluding Agent 4 from the cyber graph. As shown in FIG. 7(c), the DT estimations for the injected power from each microgrid and the voltage at the PCC are very close to the actual simulation. FIGS. 8(a)-8(c) show the second scenario where Agent 4 was attacked by injecting $x_4$=0.95 instead of $x_{i,s,s}$=0.5.

However, the actual value of 0.5p.u. was sent to the cloud to mislead the algorithm by reporting the healthy state. On the edge control system, the attack disturbed the consensus between k=75 to 110. On the cloud, the DT succeeded to calculate the healthy desired sharing factor state.

Based on the ECPS twin model, the DT realized that the edge control system was attacked. It authenticated that the PCC tertiary control shadow state and the PCC sensor state were matching. However, until this time, the DT suspected only Agent 5 (healthy agent). Between h=12 to 13, the DT had no ability to know the attacked agent because Agent 4 was still misleading them by submitting the healthy state. On the other side, the security auditing algorithm was running. Both Agent 5 and 3 used the desired state and ensured that Agent 4 was known to be attacked. Based on that reported malicious activity, the DT confirmed the attack in spite of the deception. Finally, the neighbor agents succeeded to isolate the attacked agent. The algorithm was able to discriminate between the healthy and the attacked agents even with multiple attacks and the cloud DT being misled.

Figures 9A, 9B:
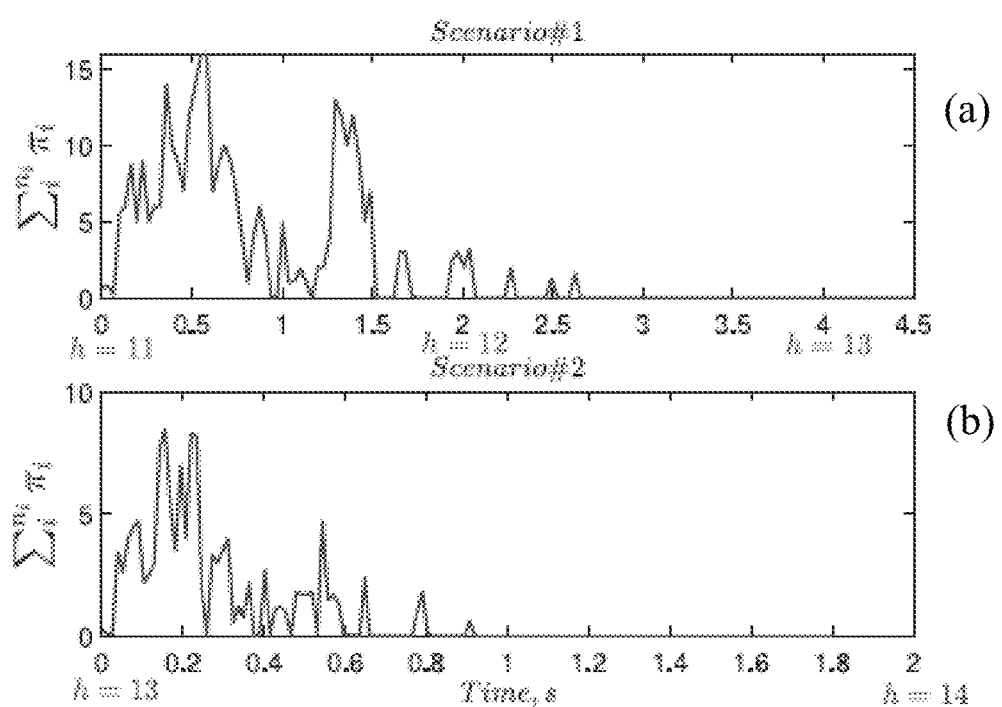
FIG. 9(a) is a plot for total residue (summation of $\pi_i$ from i to $n_i$) versus time (in seconds (s)), showing total residue during a DT based security audit for a first scenario (referred to as "Scenario 1" herein).
FIG. 9(b) is a plot for total residue (summation of $\pi_i$ from i to $n_i$) versus time (in s), showing total residue during a DT based security audit for a second scenario (referred to as "Scenario 2" herein).

FIGS. 9(a) and 9(b) show the summation of total residues of ECPS states for the LO based DT running during the security audit analysis. The Scenario 1 (Agents 1 and 4 attacked) had higher residues as compared to Scenario 2 (Agent 4 attacked) because the number of malicious agents in Scenario 1 was higher than in Scenario 2 and the execution time to decay to zero residues was higher in the first scenario.

Figures 10A, 10B:
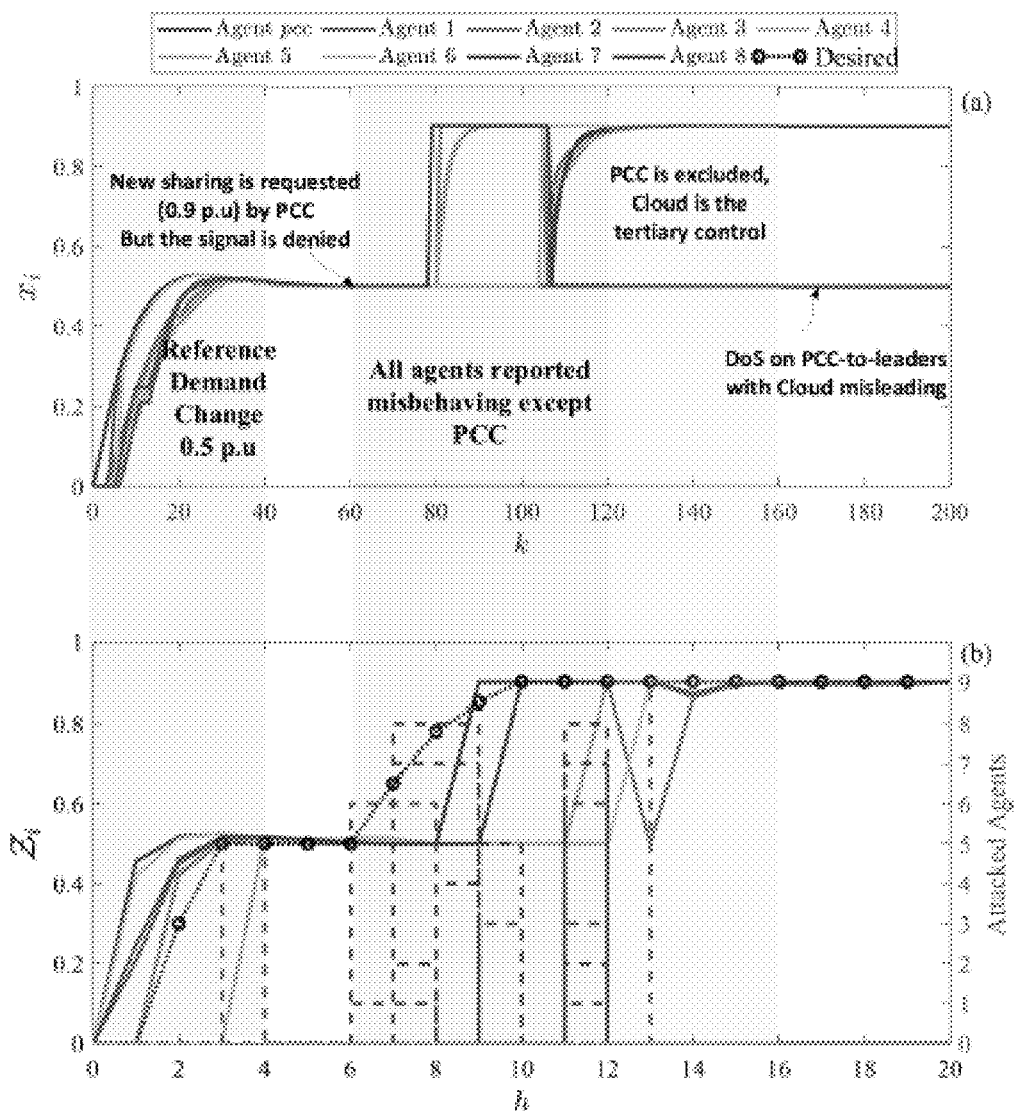
FIG. 10(a) shows a plot of $x_i$ versus k, showing response for a denial of service (DoS) attack on a link between the PCC and leader agents.
FIG. 10(b) shows a plot of $Z_i$ versus h, showing response for a DoS attack on a link between the PCC and leader agents.

In Scenario 3, a DoS attack was tested on the communication link between the PCC and the leaders. The tertiary controller at PCC requested a 40% increase in sharing power but this new command was intercepted by corrupting the communication between the PCC agent and the leaders (Agents 1 and 6) as shown in FIGS. 10(a)-10(c). Primarily, all agents reported a malicious activity due to the difference between the DT shadow state and the edge state, which triggered the PCC authentication function (Algorithm 2; FIG. 15). The LO based DT was reconstructed for the reported measurements. The DT observation was used to check the residuals and the healthy desired value is estimated according to Algorithms 1 (FIG. 14) and 2 (FIG. 15). FIG. 10(b) shows the shadow of the sharing factors on the cloud and the detected malicious agents using the DT algorithms.

Almost all agents after the attack were suspected as suspicious agents between h=6 and h=12 without certain definition of the infected agent. However, at t=13 the DT algorithms were able to ensure that the PCC agent was the infected source of information. Finally, the platform succeeded to declare that the PCC-to-MG's leader communication links were attacked, and the cloud-based DT became the tertiary controller temporarily and all agents were retrofitted to the healthy state.

Figure 11:
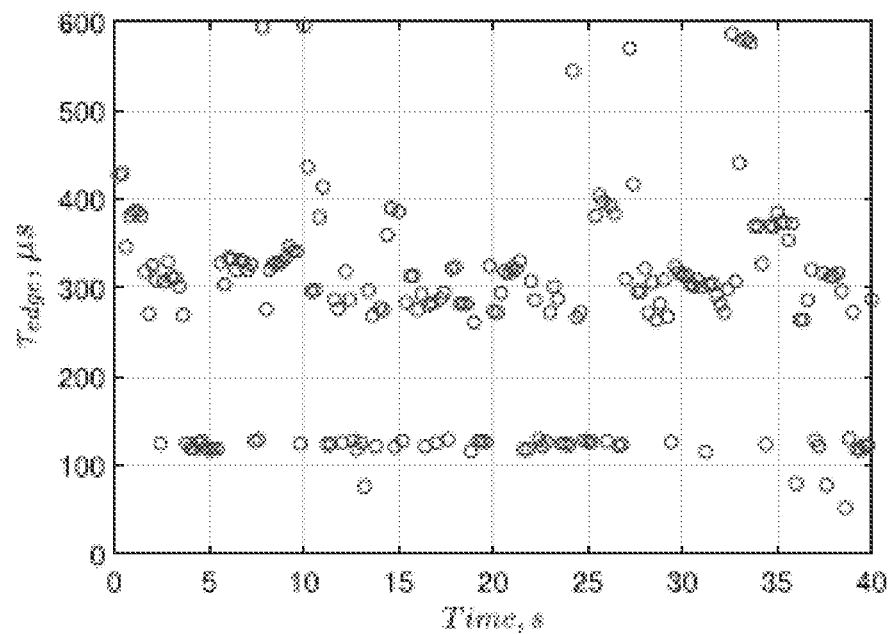
FIG. 11 shows a plot of time delay in the edge ($\tau_{edge}$, in microseconds (μs)) versus time (in s), showing an average agent-to-agent time delay in the edge for data distribution service (DDS) communication.

The performance of the communication platform was tested for both intra-edge communication (DDS) and edge-to-cloud communication (MQTT). The average intra-edge latency for all agents during Scenarios 1-3 is shown in FIG. 11. Referring to FIG. 11, the maximum latency recorded in this test was 594 μs, which ensures the message delivery using DDS near to the real-time. In order to estimate the edge-to-cloud communication delay, two events were used to demonstrate to measure the latency. As shown in FIGS. 12(a)-12(d), the reference sharing factor changes from 0% to 50% at t=1 s, then at t=21 s the tertiary command was updated from 50% to 90%. Also, in order to test the effect of a large delay and packet loss on the performance, the NETEM network emulation tool was used to emulate a delay and packet loss on published data from Agent 2 to both the edge and the cloud. The packet loss was emulated randomly during the whole test to be 5% and 2 s delay was added intentionally between t=24 s and t=26 s. Also, the test was made more challenging by setting the update reporting rate between the edge and the cloud to be one second only.

Figures 12A, 12B, 12C, 12D, 13:
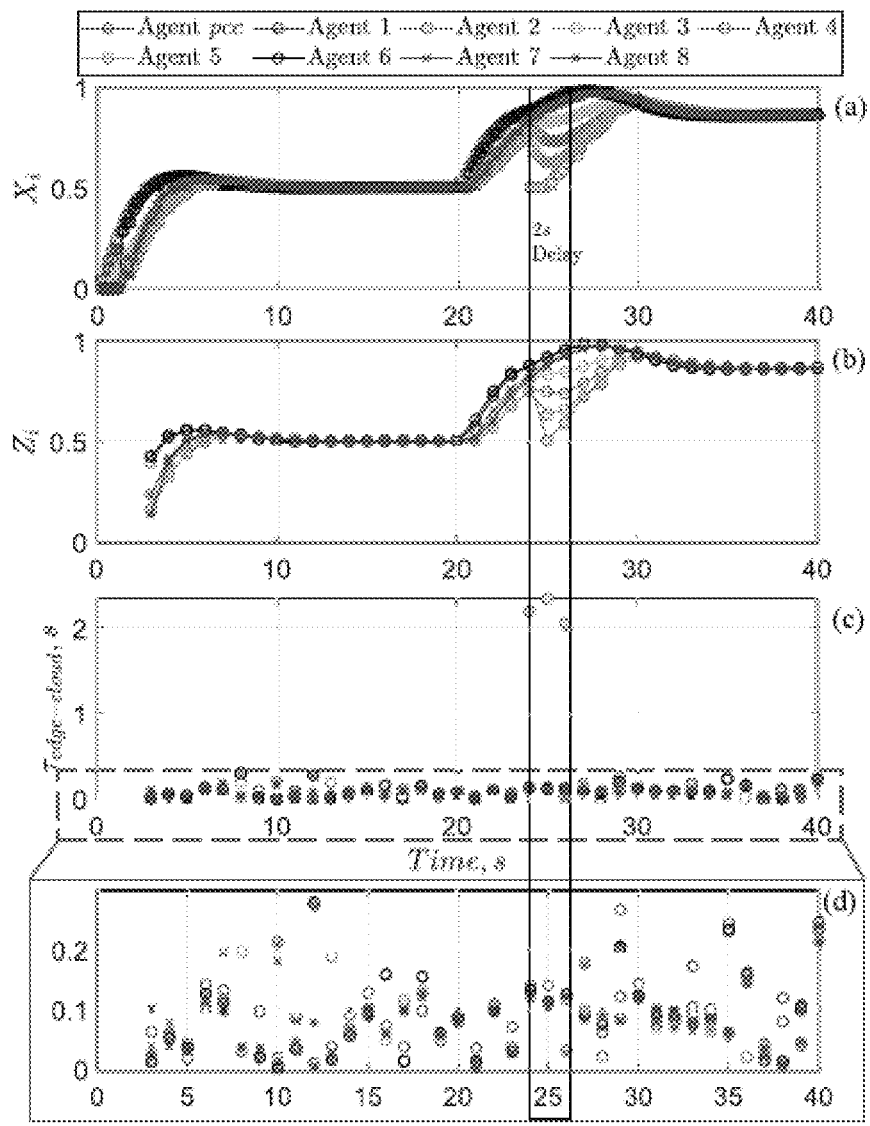
FIG. 12(a) shows a plot of $x_i$ versus time (in s), showing performance under a 2 s delay and 5% packet loss on the communication output from one agent (in this case, agent 2) to the edge and cloud channels.
FIG. 12(b) shows a plot of $Z_i$ versus time (in s), showing performance under a 2 s delay and 5% packet loss on the communication output from one agent (in this case, agent 2) to the edge and cloud channels.
FIG. 12(c) shows a plot of time delay in the edge and cloud ($\tau_{edge-cloud}$, in s) versus time (in s), showing performance under a 2 s delay and 5% packet loss on the communication output from one agent (in this case, agent 2) to the edge and cloud channels. The data points with the high time delay during the 2 s delay are for agent 2; the remaining agents all have time delays under 0.2 s during the 2 s delay.
FIG. 12(d) shows an enlargement of the lower portion of FIG. 12(c) (with the dotted box around it).
FIG. 13 shows a table of communication performance under delay for 256-byte (B) messages.

As illustrated in FIG. 12(a), the edge controllers normally followed the leaders without any noticeable effect of the packet loss on the consensus. Although the 2 s delay causes a slight disturbance in the consensus dynamics, the communication graph connectivity remained stable and achieved an agreement. Also, the same effect is reflected in the cloud shadow as shown in FIG. 12(b). In order to measure precisely the delay between the edge and the cloud, the output data from Agent 2 was stamped by the departure time and the arrival time. The difference between the two timestamps is depicted in FIG. 12(c) and zoomed in FIG. 12(d). Except for the 2 s delay period, the measured delay between the edge and the cloud did not exceed 300 milliseconds (ms).

Another test was performed to study the effect of the message size, and a 256-byte (B) JSON message was tested. The average and maximum recorded delay under best QoS effort are shown in the table in FIG. 13 for both DDS and MQTT middleware.

EXAMPLE 2

A distributed cyber control system was implemented locally on embedded single board computers. The controllers used the Wi-Fi modules onboard to communicate with each other via UDP protocol and to connect with the upper cloud layer via TCP/IP protocol. The networked control algorithms and the communication interfaces were applied on embedded Raspberry-Pi3B+ toolkits. A DDS middleware interface was used to share the control parameters within the cyber control edge. The cloud computing services that were used to implement the DT Playground were AWS. In order to communicate with the cloud, an MQTT client was created using AWS to exchange the messages. Each device had a detailed model for its microgrid to simulate the real physical system.

An event-based callback function was implemented to activate the data interface based on the events. The cyber system topology was implemented as shown in FIG. 22. The contents of the shadow were shadow states, asset metadata, update version, client token, and the timestamp of the last operation. The shadow had two classes: the reported states; and the desired states.

Figure 28:
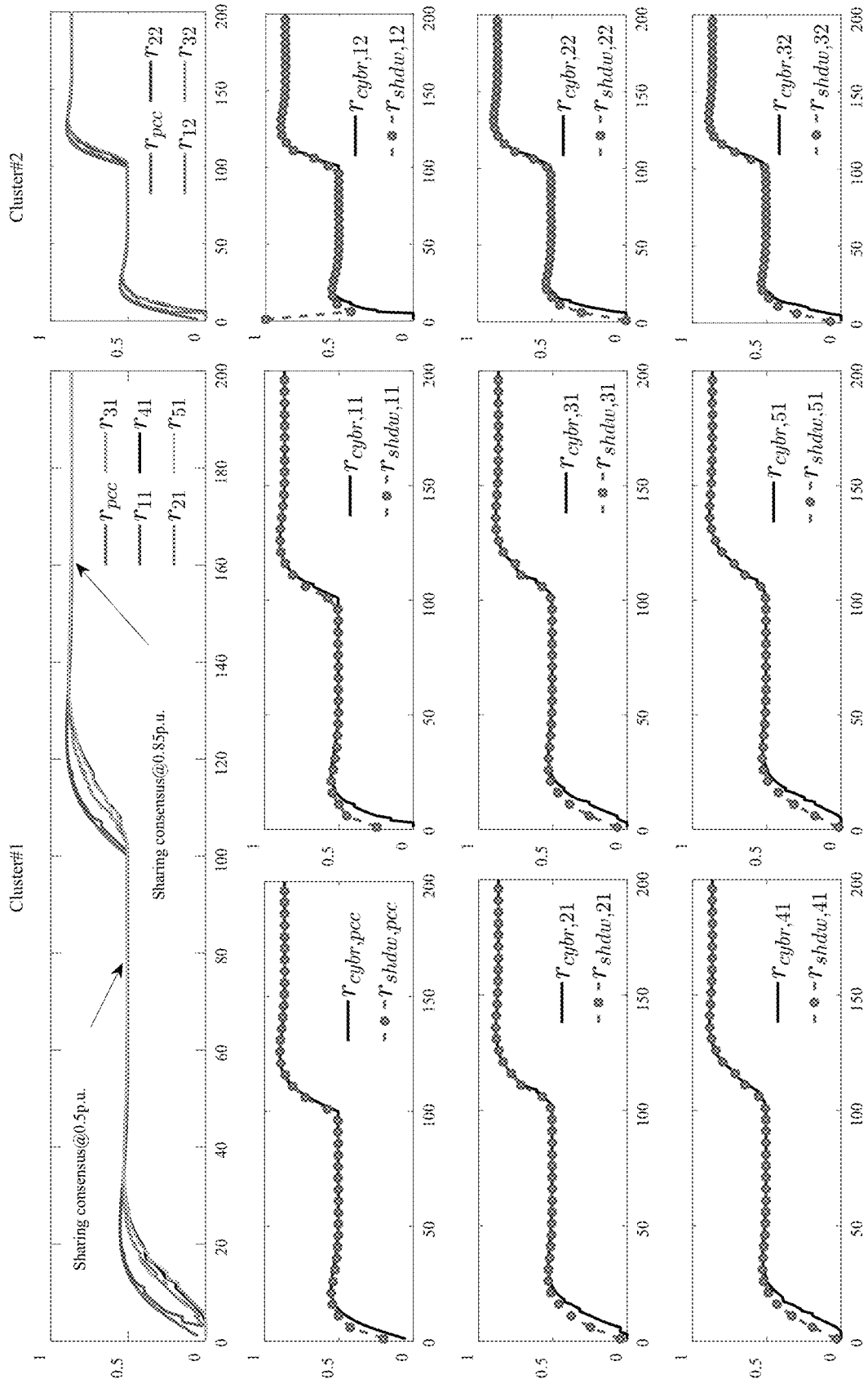
FIG. 28 shows a series of plots showing a comparison between cyber states and shadow states on the cloud.
Figure 29:
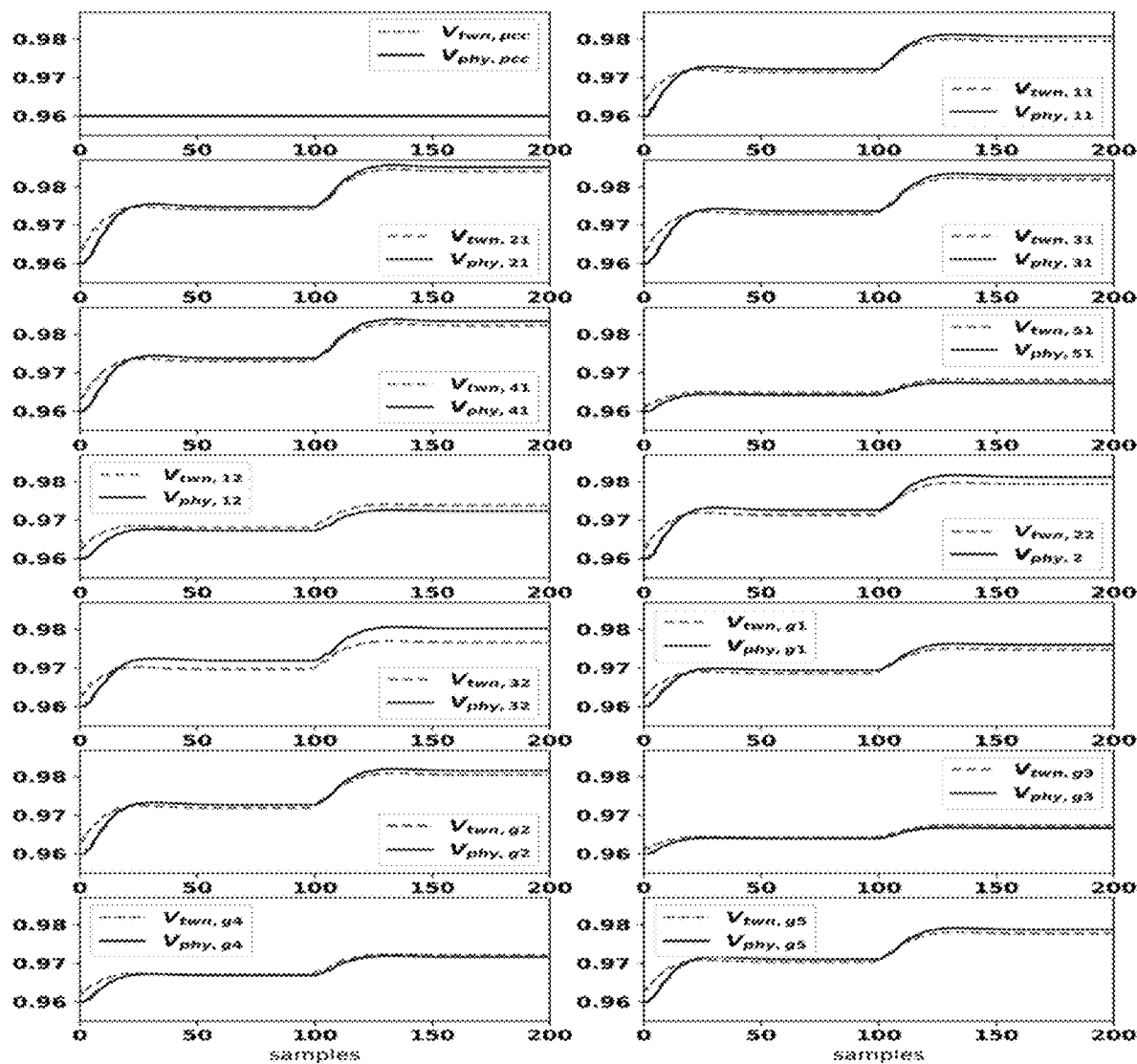
FIG. 29 shows a series of plots showing a comparison between a high bandwidth cyber DT model and the cyber states. In each plot in FIG. 25, the dashed curve is for the twin and the solid curve is for the physical.

The secondary distributed control system controls the microgrid's power electronics networked converters to support the voltage at the PCC. The implemented DT on the cloud system used the sharing factor shadows to estimate the voltage at each bus in the interconnected microgrids. The results show that the DT can replicate the actual system. A comparison between the cyber states and the shadow updates, which is updated every 5 seconds, is shown in FIG. 28. Referring to FIG. 28, the power-sharing factor consensus under two successive changes (0.5 p.u. and 0.85 p.u.) in the reference at the PCC is shown. The provisioned shadow states were used to drive the fast dynamics model to replicate the physical voltage measurements at each bus, which shows a very close response as illustrated in FIG. 29.

FIGS. 30(a)-30(c) show multiple coordinated false data injection attacks (FDIAs) on the first cluster's leader (agent 1) and agent 4, at k=55 and k=75, respectively. FIG. 30(a) displays the states on the cyber system. The SCAs detected a malicious activity and suspected agents 1, 4, and 5 but could not ensure which agents were attacked in order to isolate it/them.

The left-hand y-axis in FIG. 30(b) shows the reported IoT shadow states and the desired state. The right-hand y-axis of FIG. 30(b) (dashed line) shows the attacked agents. Agent 5 was temporarily declared as an attacked agent during h=3 to 4 because of the delay produced by the initialization of the algorithms. The disagreement of agent 5 away from the desired state at h=10 to 12 resulted from the attack on agent 4.

The DT based authentication can find the new healthy desired state and confirm that agents 1 and 4 are attacked. Therefore, even though agent 5 was subjected to the delay and misleading, the agent succeeded to use the estimated healthy PCC desired state to retrofit its consensus dynamics by comparing both neighbors with the DT desired state and mitigated the attack by excluding agent 4 from the cyber graph. As shown in FIG. 30(c), the DT estimations for the injected power from each microgrid and the voltage at the PCC are very close to the actual physical system.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A system for enhancing resiliency of a power system comprising a plurality of networked microgrids (NMGs), the system comprising:
   a processor; and
   a machine-readable medium in operable communication with the processor and having instructions stored thereon that, when executed by the processor, perform the following steps:
      receiving data from a cloud server, the data comprising controller data and sensor data of the power system;
      generating in real-time a digital twin (DT) for the plurality of NMGs based on the controller data and the sensor data received from the cloud server, the DT comprising a physical dynamics model and a cyber dynamics model;
      monitoring operation of the plurality of NMGs of the DT; and
      taking corrective action to mitigate any attacks on an NMG of the plurality of NMGs of the DT,
   the taking of corrective action to mitigate any attacks on an NMG of the plurality of NMGs of the DT comprising:
      using a Luenberger Observer to construct and test multiple what-if scenarios to authenticate a healthy desired control state of the DT; and
      returning the DT to the healthy desired control state.

2. The system according to claim 1, the power system being an energy cyber-physical system (ECPS).

3. The system according to claim 1, further comprising a plurality of intelligent electronic devices (IEDs), each IED of the plurality of IEDs comprising an NMG of the plurality of NMGs.

4. The system according to claim 1, the DT comprising a plurality of agents comprising a leader agent and a plurality of follower agents, the leader agent corresponding to a device of a point of common coupling (PCC).

5. The system according to claim 1, the DT being an internet of things (IoT)-based DT.

6. The system according to claim 5, the DT comprising a shadow twin of the power system, the shadow twin comprising a plurality of agents comprising a leader agent and a plurality of follower agents, the leader agent corresponding to a device of a PCC, the follower agents of the plurality of follower agents respectively corresponding to a plurality of IEDs of the power system, and each IED of the plurality of IEDs being coupled to the device of the PCC.

7. A method for enhancing resiliency of a power system comprising a plurality of networked microgrids (NMGs), the method comprising:

receiving, by a processor, data from a cloud server, the data comprising controller data and sensor data of the power system;

generating, by the processor, in real-time a digital twin (DT) for the plurality of NMGs based on the controller data and the sensor data received from the cloud server, the DT comprising a physical dynamics model and a cyber dynamics model;

monitoring, by the processor, operation of the plurality of NMGs of the DT; and taking, by the processor, corrective action to mitigate any attacks on an NMG of the plurality of NMGs of the DT, the taking of corrective action to mitigate any attacks on an NMG of the plurality of NMGs of the DT comprising:

using a Luenberger Observer to construct and test multiple what-if scenarios to authenticate a healthy desired control state of the DTI; and returning the DT to the healthy desired control state.

8. The method according to claim 7, the power system being an energy cyber-physical system (ECPS).

9. The method according to claim 7, the power system further comprising a plurality of intelligent electronic devices (IEDs), each IED of the plurality of IEDs comprising an NMG of the plurality of NMGs.

10. The method according to claim 7, the DT comprising a plurality of agents comprising a leader agent and a plurality of follower agents, the leader agent corresponding to a device of a point of common coupling (PCC).

11. The method according to claim 7, the DT being an internet of things (IoT)-based DT, the DT comprising a shadow twin of the power system, the shadow twin comprising a plurality of agents comprising a leader agent and a plurality of follower agents, the leader agent corresponding to a device of a PCC, the follower agents of the plurality of follower agents respectively corresponding to a plurality of IEDs of the power system, and each IED of the plurality of IEDs being coupled to the device of the PCC.

12. A system for enhancing resiliency of a power system comprising a plurality of networked microgrids (NMGs), the system comprising:

a processor; and a machine-readable medium in operable communication with the processor and having instructions stored thereon that, when executed by the processor, perform the following steps:

receiving data from a cloud server, the data comprising controller data and sensor data of the power system;

generating in real-time a digital twin (DT) for the plurality of NMGs based on the controller data and the sensor data received from the cloud server, the DT comprising a physical dynamics model and a cyber dynamics model;

monitoring operation of the plurality of NMGs of the DT; and taking corrective action to mitigate any attacks on an NMG of the plurality of NMGs of the DT, the power system being an energy cyber-physical system (ECPS), the system further comprising a plurality of intelligent electronic devices (IEDs), each IED of the plurality of IEDs comprising an NMG of the plurality of NMGs, the DT being an internet of things (IoT)-based DT, the DT comprising a plurality of agents comprising a leader agent and a plurality of follower agents, the leader agent corresponding to a device of a point of common coupling (PCC), the follower agents of the plurality of follower agents respectively corresponding to the plurality of IEDs of the power system, each IED of the plurality of IEDs being coupled to the device of the PCC, and the taking of corrective action to mitigate any attacks on an NMG of the plurality of NMGs of the DT comprising:

using a Luenberger Observer to construct and test multiple what-if scenarios to authenticate a healthy desired control state of the DT; and returning the DT to the healthy desired control state.

* * * * *